United States Patent
Drake et al.

(10) Patent No.: US 11,277,338 B2
(45) Date of Patent: Mar. 15, 2022

(54) DISTRIBUTING SERVICE FUNCTION CHAIN DATA AND SERVICE FUNCTION INSTANCE DATA IN A NETWORK

(71) Applicant: Juniper Networks, Inc., Sunnyvale, CA (US)

(72) Inventors: John E. Drake, Pittsburgh, PA (US); Eric C. Rosen, Arlington, MA (US); William Stuart Mackie, Carmel, NY (US); Adrian Farrel, Llangollen (GB)

(73) Assignee: Juniper Networks, Inc., Sunnyvale, CA (US)

( * ) Notice: Subject to any disclaimer, the term of this patent is extended or adjusted under 35 U.S.C. 154(b) by 893 days.

(21) Appl. No.: 15/368,282

(22) Filed: Dec. 2, 2016

(65) Prior Publication Data
US 2018/0091420 A1   Mar. 29, 2018

Related U.S. Application Data

(60) Provisional application No. 62/399,934, filed on Sep. 26, 2016.

(51) Int. Cl.
*H04L 12/741* (2013.01)
*H04L 29/08* (2006.01)
(Continued)

(52) U.S. Cl.
CPC .............. *H04L 45/74* (2013.01); *H04L 45/00* (2013.01); *H04L 45/306* (2013.01); *H04L 45/38* (2013.01);
(Continued)

(58) Field of Classification Search
None
See application file for complete search history.

(56) References Cited

U.S. PATENT DOCUMENTS 8,909,736 B1 * 12/2014 Bosch ................. H04L 67/1093
709/217
2010/0124225 A1    5/2010 Fedyk
(Continued)

FOREIGN PATENT DOCUMENTS

CN    102217238 A    10/2011
CN    104067566 A    9/2014
(Continued)

OTHER PUBLICATIONS

Fernando et al., "Service Chaining using Virtual Networks with BGP VPNs, draft-fm-bess-service-chaining-02," Internet Engineering Task Force, Dec. 7, 2015, 42 pp.
(Continued)

*Primary Examiner* — Sai Aung
(74) *Attorney, Agent, or Firm* — Shumaker & Sieffert, P.A.

(57) ABSTRACT

In some examples, a computing device comprises a first service function instance to apply a service function and a service function forwarder to: receive a first layer 3 routing protocol route advertisement that includes service function instance data for a second service function instance, the service function instance data indicating a service function type and a service identifier for the service function instance; receive a second layer 3 routing protocol route advertisement that includes service function chain data for a service function chain, the service function chain data indicating a service path identifier and one or more service function items; and send, to the second service function instance and based at least on determining a service function item of the one or more service function items indicates the second service function instance, a packet classified to the service function chain.

18 Claims, 10 Drawing Sheets

(51) Int. Cl.

| | | |
|---|---|---|
| *H04L 12/54* | (2013.01) | |
| *H04L 12/721* | (2013.01) | |
| *H04L 45/74* | (2022.01) | |
| *H04L 45/00* | (2022.01) | |
| *H04L 67/10* | (2022.01) | |
| *H04L 45/30* | (2022.01) | |
| *H04L 45/64* | (2022.01) | |
| *H04L 67/63* | (2022.01) | |
| *H04L 69/325* | (2022.01) | |
| *H04L 41/5054* | (2022.01) | |

(52) U.S. Cl.
CPC ............ *H04L 45/64* (2013.01); *H04L 67/10* (2013.01); *H04L 67/327* (2013.01); *H04L 69/325* (2013.01); *H04L 41/5054* (2013.01); *H04L 2212/00* (2013.01)

(56) References Cited

U.S. PATENT DOCUMENTS

| | | | |
|---|---|---|---|
| 2013/0195111 A1 | 8/2013 | Allan et al. | |
| 2014/0086253 A1* | 3/2014 | Yong | H04L 12/4633 370/395.53 |
| 2014/0334488 A1 | 11/2014 | Guichard et al. | |
| 2016/0050141 A1* | 2/2016 | Wu | H04L 41/5054 370/389 |

FOREIGN PATENT DOCUMENTS

| | | |
|---|---|---|
| EP | 2963866 A2 | 1/2016 |
| EP | 3148149 A1 | 3/2017 |
| WO | 2013184846 A1 | 12/2013 |

OTHER PUBLICATIONS

Extended Search Report from counterpart European Application No. 17193314.6, dated Feb. 13, 2018, 10 pp.
Rosen, et al., "The BGP Tunnel Encapsulation Attribute," IDR Working Group Internet-Draft, May 31, 2016, 40 pp.
Patel, et al., "Service Advertisement using BGP," Network Working Group, Internet-Draft, Apr. 26, 2013, 12 pp.
Farrel, et al., "BGP Control Plane for NSH SFC," draft-mackie-bess-nsh-bgp-control-plane-00, BESS Working Group, Internet-Draft, Oct. 14, 2016, 36 pp.
Raszuk, et al., "BGP vector routing." Network Working Group, Internet-Draft, May 31, 2016, 12 pp.
Rekhter, et al., "A Border Gateway Protocol 4 (BGP-4)," Network Working Group, RFC 4271, Jan. 2006, 104 pp.
Rosen, et al.,"BGP/MPLS IP Virtual Private Networks (VPNs)," Network Working Group, RFC 4364, Feb. 2006, 47 pp.
Bates, et al., "Multiprotocol Extensions for BGP-4," Network Working Group, RFC 4760, Jan. 2007, 12 pp.
Quinn, et al., "Problem Statement for Service Function Chaining," Internet Engineering Task Force, RFC 7498, Apr. 2015, 13 pp.
Halpern, et al., "Service Function Chaining (SFC) Architecture," Internet Engineering Task Force, RFC 7665, Oct. 2015, 32 pp.
U.S. Appl. No. 14/226,509, filed Mar. 26, 2014.
Farrel, et al., "BGP Control Plane for NSH SFC," draft-mackie-bess-nsh-bgp-control-plane-01, BESS Working Group, Internet-Draft, Oct. 30, 2016, 37 pp.
Response to Extended Search Report dated Feb. 13, 2018, from counterpart European Application No. 17193314.6, filed Sep. 26, 2018, 12 pp.
Notice of Intent to Grant and Text Intended to Grant from counterpart European Application No. 17193314.6, dated Mar. 26, 2019, 69 pp.
Extended Search Report from counterpart European Application No. 19191630.3, dated Nov. 21, 2019, 9 pp.
Response to Extended Search Report dated Nov. 21, 2019 from counterpart European Application No. 19191630.3, filed Jun. 22, 2020, 23 pp.
First Office Action and Search Report, and translation thereof, from counterpart Chinese Application No. 201710886475.9, dated Mar. 23, 2020, 24 pp.
Second Office Action and Search Report, and translation thereof, from counterpart Chinese Application No. 201710886475.9, dated Dec. 11, 2020, 8 pp.
Notice of Intent to Grant and Text Intended to Grant from counterpart European Application No. 19191630.3, dated Jan. 13, 2021, 67 pp.

* cited by examiner

DISTRIBUTING SERVICE FUNCTION CHAIN DATA AND SERVICE FUNCTION INSTANCE DATA IN A NETWORK

This application claims the benefit of U.S. Provisional Application No. 62/399,934, filed Sep. 26, 2016, the entire contents of which is incorporated herein by reference.

TECHNICAL FIELD

The disclosure relates to computer networks and, more specifically, to applying network services to data traffic traversing computer networks.

BACKGROUND

A computer network is composed of a set of nodes and a set of links that connect one node to another. For instance, a computer network may be composed of a set of routers while the set of links may be paths between the routers. When a first node in the network sends data traffic to a second node in the network, the message may pass through many links and many nodes. The set of links and nodes that the message passes through while traveling from the first node to the second node is referred to as a path through the network.

A network operator may deploy one or more computing devices to apply, to data traffic traversing a computer network, network services such as firewall, carrier grade network address translation (CG-NAT), performance enhancement proxies for video, transport control protocol (TCP) optimization and header enrichment, caching, and load balancing. Each of these network services may be referred to as a service function and is implemented by one or more service function instances. In addition, the network operator may configure service function chains (also referred to herein as "service function chains") that each identify a set of the service functions to be applied to packet flows mapped to the respective service function chains. A service function chain, in other words, defines one or more service functions to be applied in a particular order to provide a composite service for application to packet flows bound to the service function chain for processing. In this way, a service function chain is a sequence of service functions through which packet flows satisfying specified criteria will pass. An example service function chain architecture is described in Halpern, J., Ed. and C. Pignataro, Ed., "Service Function Chaining (SFC) Architecture", RFC 7665, October 2015, available at www.rfc-editor.org/info/rfc7665, which is incorporated by reference herein in its entirety.

SUMMARY

In general, techniques are described for leveraging a layer 3 (L3) routing protocol to instantiate service chains within a network. As described herein, the routing protocol is extended to enable distribution of service function data that describes one or more available service functions and to distribute service function chain data that describes overlay topologies for service function chains each made up of one or more service functions described by the service function data. For example, in a computer network that offers service functions, each service function instance in the network applies a service function and is hosted by a computing device that advertises, using the extended layer 3 routing protocol, the service function to other service function instances. More particularly, a computing device that hosts a service function instance may output a layer 3 routing protocol route advertisement (e.g., a BGP message) that includes a network address for the computing device and service function instance data that specifies a service function type for the service function and a service identifier, where the combination of the service function type and the service identifier identify the service function instance in the network. The layer 3 routing protocol route advertisements may in some instances specify an address family for the service function instance data that varies from the address family of the underlay computer network and, in this way, the layer 3 routing protocol route advertisements distribute service function data for an overlay network of service function instances overlaying the computer network made up of a plurality of computing devices.

A controller or other device that determines service function chains may distribute service function chain data by injecting, into the network, layer 3 routing route protocol advertisements that each identifies a service function chain and specifies an ordered set of one or more service functions for the service function chain. Each of the service functions may be specified as one or more particular service function instances or may alternatively be specified as a service function in that any service function instance that applies the service function may be used in the service function chain. A layer 3 routing protocol route advertisement that identifies a service function chain as described herein may thus advertise a partial overlay network topology for the overlay network of service function instances, in that the ordered set of one or more service indices of the service function chain indicates a path in the overlay network topology to be traversed by packet flows bound to the service function chain for processing.

Computing devices that receive service function data and service function chain data in one or more layer 3 routing protocol route advertisements use the service function data and service function chain data to forward, according to the overlay network, packet flows bound to the service function chains. Whereas conventional deployment models for service functions are often tightly coupled to network topology and physical resources, the techniques of this disclosure for distributing service function overlay network node and topology data may enable decoupling of service function chaining from an underlying network topology of a computer network that offers network services. Such decoupling may simplify configuring or modifying a service function chain by reducing, and in some cases eliminating, changes to the underlying network topology that would otherwise be required to support the new service function chain. The techniques may provide further advantages in some instances by enabling service function chaining with alternate (or redundant) service functions that do not need to be co-located (e.g., applied by the same computing device) with the primary service function. Moreover, the techniques may at least in some instances overcome underlay network forwarding asymmetries to enable forward and reverse service function chains for forward and reverse packet flows (e.g., for bidirectional flow processing by a firewall).

In one example, a method comprises receiving, by a computing device, a first layer 3 routing protocol route advertisement that includes service function instance data for a service function instance, the service function instance data indicating a service function type and a service identifier for the service function instance; receiving, by the computing device, a second layer 3 routing protocol route advertisement that includes service function chain data for a service function chain, the service function chain data indicating a service path identifier and one or more service function items; and sending, by the computing device to the service function instance and based at least on determining a service function item of the one or more service function items indicates the service function instance, a packet classified to the service function chain.

In another example, a computing device comprises one or more processors operably coupled to a memory; a first service function instance configured for execution by the one or more processors to apply a service function; a service function forwarder configured for execution by the one or more processors to: receive a first layer 3 routing protocol route advertisement that includes service function instance data for a second service function instance, the service function instance data indicating a service function type and a service identifier for the service function instance; receive a second layer 3 routing protocol route advertisement that includes service function chain data for a service function chain, the service function chain data indicating a service path identifier and one or more service function items; and send, to the second service function instance and based at least on determining a service function item of the one or more service function items indicates the second service function instance, a packet classified to the service function chain.

In another example, a controller comprises one or more processors operably coupled to a memory, wherein the one or more processors are configured to output a first layer 3 routing protocol route advertisement that includes service function chain data for a service function chain, the service function chain data indicating a service path identifier and one or more service function items.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
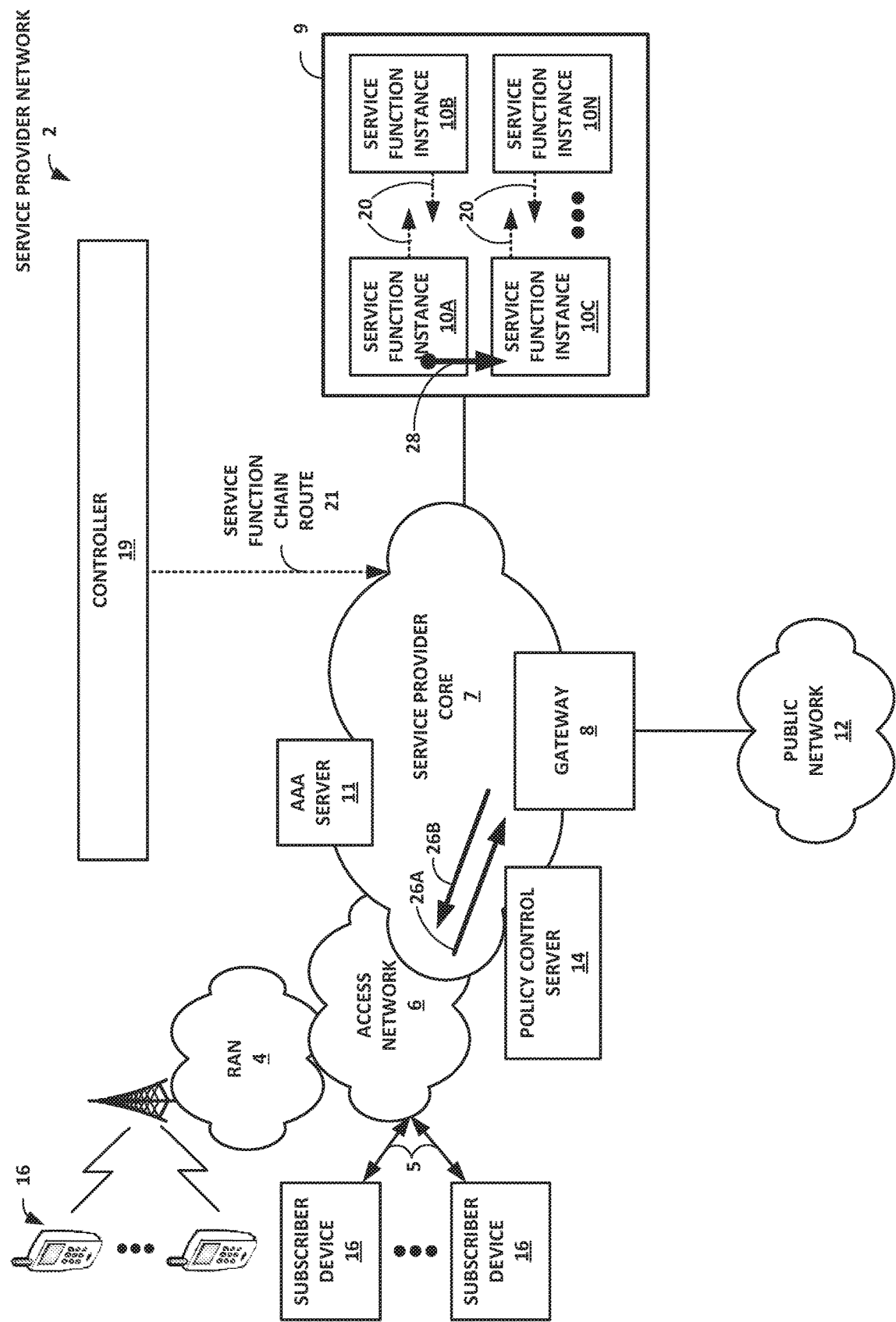
FIG. 1 illustrates an example network system in accordance with techniques described herein.

FIG. 1 illustrates an example network system in accordance with techniques described herein. The example network system of FIG. 1 includes a service provider network 2 to provide packet-based network services to subscriber devices 16A-16N (collectively, "subscriber devices 16"). That is, service provider network 2 provides authentication and establishment of network access for subscriber devices 16 such that the subscriber device may begin exchanging data packets with public network 12, which may be an internal or external packet-based network such as the Internet.

In the example of FIG. 1, service provider network 2 comprises access network 6 ("access network 6") that provides connectivity to public network 12 via service provider core network 7 and gateway 8. Service provider core network 7 and public network 12 provide packet-based services that are available for request and use by subscriber devices subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of public network 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing PDN 12. Core network 7 may represent a network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by public network 12, and such packets traverse gateway 8 as part of at least one packet flow. Flows 26A illustrated in FIG. 1 represent one or more upstream packet flows from any one or more subscriber devices 16 and directed to PDN 12. Flows 26B represent one or more downstream packet flows flow PDN 12 and directed to any one or more subscriber devices 16.

The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

The techniques described in this disclosure may apply to packet flows between any two computing devices and are not limited to application to flows 26 depicted in FIG. 1.

As described herein, service provider network includes a services complex 9 having service function instances 10A-10N that provide an execution environment for the network services. That is, each of service function instances 10 apply one or more service functions. A service function applies to received packets of packet flows and can act at various layers of a protocol stack (e.g., network layer, application layer).

As examples, service functions applied by service function instances 10 may include firewall and security services, carrier grade network address translation (CG-NAT), media optimization (voice/video), WAN optimization, NAT44, NAT64, HTTP header enrichment functions, TCP optimizers, IPSec/VPN services, deep packet inspection (DPI), HTTP filtering, counting, accounting, charging, and load balancing of packet flows or other types of services applied to network traffic. Service functions may be alternately referred to as virtualized network functions (VNFs), although service functions need not be virtual. Each of service function instances 10 in this way represents an instance of a service function instance. Each of service function instances represents a component that may be realized as a virtual element of a computing device (e.g., a real server) and/or embedded in a physical network element (e.g., a firewall or NAT appliance). Multiple service function instances 10 may be executed in a single computing device or physical network element computing device. A computing device that hosts one or more service function instances 10 may refer to a real server or a physical network element.

Although illustrated as part of a services complex 9, which may represent a data center, service function instances 10 may, for instance, be located within core network and be interconnected by one or more switches or virtual switches of core network 7. Service function instances 10 may in some instances be located in multiple different data centers. One or more service function instances 10 may be located within an enterprise/customer site attached to service provider core 7. In some examples, each of service function instances 10 may be executed by a virtual machine in virtual compute environment. Moreover, the compute environment may comprise a scalable cluster of general computing devices, such as x86 processor-based servers. As another example, service function instances 10 may be executed by a combination of general purpose computing devices and special purpose appliances. As virtualized, individual network services provided by service function instances 10 can scale just as in a modern data center, through the allocation of virtualized memory, processor utilization, storage and network policies, as well as horizontally by adding additional load-balanced virtual machines.

In example of FIG. 1, gateway 8 steers individual packet flows 26 through defined sets of service functions provided by service function instances 10. That is, each packet flow may be forwarded through a particular ordered combination of service functions, each ordered combination providing an overall "network service" or "composite service" and being referred to herein as a "service function chain" or, more simply, a "service chain." A service function chain may include, for a given service function in the service function, a particular service function instance 10 that provides the service function or may indicate that the service function may be applied by any service function instance 10 that provides the service function. In this way, packet flows 26 may be processed by service function instances 10 as the packets flow between access network 6 and public network 12 according to service function chains configured by the service provider. A particular service function instance 10 may support multiple service function chains. An example service chain 28 is depicted in FIG. 1 and includes, in order, service function instance 10A and service function instance 10C.

Whereas a "service function chain" defines one or more services to be applied in a particular order to provide a composite service for application to packet flows bound to the service function chain, a "service tunnel" or "service path" refers to a logical and/or physical path taken by packet flows processed by a service function chain along with the forwarding state for forwarding packet flows according to the service function chain ordering. Each service function chain may be associated with a respective service tunnel.

Gateway 8 or one or more of service functions nodes 10 may classify packet flows 26 to service function chains. Classification granularity may vary based on device capabilities, customer requirements, service provider network policies, and services offered. Initial classification determines the service function chain with which to process a packet flow. Subsequent classification may occur within a service function chain to alter the sequence of service functions applied.

Service function instances 10 may implement each service function chain using internally configured forwarding state that directs packets of the packet flow along a service function chain for processing according to the identified set of service function instances 10. Such forwarding state may specify tunnel interfaces for tunneling between service function instances 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. Tunnel encapsulation for service function chaining may be referred to as service function chain encapsulation, which enables the creation of the service function chain in the data place of service provider network 2. In some instances, real or virtual switches, routers or other network elements that interconnect connect service function instances 10 may be configured to direct packet flow to the service function instances 10 according to service function chains.

Service function chain encapsulation enables forwarding between service function instances 10 that provide a service function overlay network over a physical underlay network, the physical underlay network made up of an existing layer 3 network topology of computing devices, such as real servers, interconnected by routing and switching equipment for exchanging packetized data between the computing devices. The service function overlay network may enable the network service provider to create paths between service function instances 10 and to locate service functions in service provider network 2 in a network topology-independent manner, e.g., without requiring changes to the underlay network topology.

In FIG. 1, controller 19 may manage deployment of service function instances within the operating environment of services complex 9. For example, controller 19 may orchestrate a service function and deploy the service function to a service function instance 10A. In some examples, controller 19 may orchestrate a virtual machine, container, or other operating environment to host to the orchestrated service function. Controller 19 may orchestrate service functions in response to requests from applications or network service provider operators.

In accordance with techniques described in this disclosure, computing devices that implement service function instances 10 leverage a layer 3 routing protocol to distribute service function data that describes service function instances 10. More particularly, a computing device that hosts at least one service function instance 10 may output a service function instance route 20. In general, a service function instance route (SFIR) describes a particular service function instance of a particular service function and the way to forward a packet to the service function instance through the underlay network. For example, service function instance route 20 may include a network address for the computing device and service function instance data that specifies, for one or more service function instances 10 hosted by the computing device, a service function type for the service function and a service identifier, where the combination of the service function type and the service identifier identify the service function instance 10 in the service provider network 2. The service function instance routes 20 may in some instances specify an address family for the service function instance data that varies from the address family of the underlay computer network and, in this way, the service function instance routes 20 distribute service function data for an overlay network of service function instances 10 overlaying the computer network made up of computing devices.

In the illustrated example, computing devices that host service function instances 10 send and receive service function instance routes 20 that describe service function instances 10. A service function instance route 20 for service function instance 10A (for instance) may include a service function type of the service function applied by service function instance 10A and a service identifier for the service function applied by service function instance 10A. The combination of the service function type and the service identifier may uniquely identify service function instance 10A from among the service function instances 10 in the service function overlay network. A service function instance route 20 may include service function data for multiple service function instances 10.

A service function instance route 20 may represent or be included in a layer 3 routing protocol route advertisement, such as a Border Gateway Protocol (BGP) message, e.g., a BGP UPDATE message. The BGP UPDATE message may conform to BGP with multiprotocol extensions (MP-BGP). The service function data that describes a service function instance 10 may represent Network Layer Reachability Information (NLRI) of a BGP UPDATE message. A service function instance route 20 may include multiple such NLRI to describe respective service function instances 10 where, for instance, a single computing device hosts multiple service function instances 10. The service identifier for the service function applied by a service function instance 10 being described may be a route distinguisher of the NRLI to allow a computing device that hosts a service function instance 10 to advertise multiple routes for the same service function. BGP and MP-BGP are described in "Multiprotocol Extensions for BGP-4," Request for Comments 4760, Network Working Group, Internet Engineering Task Force, January, 2007, and in "A Border Gateway Protocol 4 (BGP-4)," Request for Comments 4271, Network Working Group, Internet Engineering Task Force, January, 2006. Route distinguishers are described in "BGP/MPLS IP Virtual Private Networks (VPNs)," Request for Comments 4364, Network Working Group, Internet Engineering Task Force, February, 2006. Each of the above documents is incorporated by reference herein in its entirety.

In some cases, a service function instance route 20 may be originated by the computing device that hosts the described service function instance 10. However, service function instance routes 20 may be originated by controller 19 or other another device. A service function instance route 20 includes a network address, such as an IPv4 or IPv6 address, for the computing device that hosts the service function instances 10 being described. In some example, the service function instance route 20 may further include encapsulation data that describes the tunnel encapsulation for packets to be received by the computing device in order to reach the service function instances 10.

Controller 19 may leverage a layer 3 routing protocol to distribute service function chain data that describes overlay topologies for service function chains each made up of one or more service function instances 10 described by the service function chain data. For example, controller 19 may output, to service provider network 2, a service function chain route 21 that includes an ordered set of one or more service function instances 10 to define a service chain with which to process at least one packet flow 26. Controller 19 may inject the service function chain route 21 into service provider network 21 by sending the service function chain route 21 to any of service function instances 10, a route reflector, or another routing device of service provider network 2, for advertisements by the routing device in the network. Controller 19 may be a layer 3 routing protocol speaker and advertise service function chain route 21 directly. Controller 19 may output multiple service function chain routes, service function chain route 21 being only one example. In general, controller 19 originates one service function chain route per service function chain, and each service function chain route may include a service path identifier for the service function chain described, a sequence of service function types and/or service function instances of which the chain consists, and for each such service function type and/or service function instance, a service index that represents it in the service function chain described.

Controller 19 may receive service function instance routes 20 via the layer 3 protocol. Controller 19 may use service function instance data included in service function instance routes 20 to generate a service function chain and the service function chain route 21 for the service function chain. For example, controller 19 may receive a request from an operator to create a service function chain that has a series of service functions (each with a different service function type) for application to a packet flow. Controller 19 may identify service function instances that match the service function types for the service functions, as indicated in the service function instance routes 20.

For example, the service function chain data provided by controller 19 may specify any combination and ordering of service functions provided by service function instances 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service function chain. Further example details of a controller are described in PCT International Patent Application PCT/US13/44378, filed Jun. 5, 2013, the entire contents of which are incorporated herein by reference.

Service function chain route 21 includes service function chain data for service function chain 28 in the example of FIG. 1, where service function chain 28 includes service function instances 10A and 10C. Service function chain route 21 may identify each service function by indicating one or more service function instances 10 that offer the service function. For example, service function chain route 21 may identify a service function offered by service function instance 10A by indicating the combination of the service function and the service identifier that uniquely identifies the service function in the service function overlay network as being offered by service function instance 10A. For any of the service functions of a service function chain, the service function chain route 21 may identify the service function type and indicate that any service function instance 10 that offers the service function may be used to apply the service function to packets being processed using the service function chain. In this way, a service function chain route 21 may facilitate load balancing and redundancy among the service function instances 10 that offer the service function. The service function chain route 21 may include a corresponding service index for each service function in the service function chain. The service function chain route 21 may further include a service path identifier that identifies the service function chain. A service path identifier (SPI) identifies a specific service function chain.

Service function chain route 21 may represent a layer 3 routing protocol route advertisement, such as a BGP message, e.g., a BGP UPDATE message. The BGP UPDATE message may conform to BGP with multiprotocol extensions (MP-BGP). The service function data that describes a service function chain may represent Network Layer Reachability Information (NLRI) of a BGP UPDATE message, one or more BGP path attributes, or a combination of NLRI and one or more BGP path attributes.

Service function instances 10 receive service function instance routes 20 and service function chain route 21. Using the service function instance data and service function chain data included in service function instance routes 20 and service function chain route 21, each service function instance 10 may determine forwarding operations for packets received by the service function instance 10.

Service function instance 10A may operate as an ingress service function instance for the service function overlay network to apply a classification service function to packet flows. In such cases, service function instance 10A may be referred to as a "classifier," which is a special service function located at an each ingress point to a service function overlay network. In such instances, service function instance 10A operating as a classifier assigns the packets of a given packet flow to a specific service function chain. To classify a packet flow for processing using a service function chain, service function instance 10A may apply policies to packet header fields of the packet flow packets to determine the service chain. Policies may be specific to a subscriber of a subscriber device 16, specific to a network, or specific to an application service transported using the packet flow, for instance. A policy may specify a service path identifier that identifies the service function chain for processing packets that match the policy. In some cases, service function instance 10A operating as a classifier selects a service function chain for a packet flow, sets the service path identifier for the service function chain, sets the service index for the first hop in the selected service function chain, and prepends to packets of the packet flow a network service header indicating the service path identifier and the service index. The classifier and the node that hosts the first service function In the example of FIG. 1, service function instance 10A may classify one or more of packet flows 26 to service function chain 28. Although service function instance 10A is the first service function instance in service function chain 28, service function instance 10A may classify some packets flows 26 to service function chains that do not have service function instance 10A as the first service function instance. In addition, a computing device other than one of service function instances 10 may classify packet flows to service function chains and direct the packet flows to first service function instances 10 in the service function chains.

To apply the service functions indicated by a service function chain, service function instances 10 forward a packet through an ordered combination of service function instances 10 for application of corresponding service functions. A service function instance 10 that applies a service function to a packet determines a next service function instance 10 in a service function chain based on the service function chain route 21 that advertised the service function chain and on one or more service function instance routes 20 for service function instances and received by the service function instance 10.

For example, service function instance 10A may determine to forward a packet classified to service function chain 28 by determining, based on service function chain route 21, a next service function instance 10 to apply the next service function in the service function chain 28. Service function chain route 21 may indicate, using a service identifier and service function type that in combination identify service function instance 10C from one or service function instance routes 20, that service function instance 10C is a next service function instance in the service chain 28. Service function instance 10A may further determine the service path identifier included in service function chain route 21 and a service index for the next service function to be applied by service function instance 10C, as indicated by service function chain route 21.

Service function instance 10A forwards the packet to service function instance 10C. Service function instance 10A may forward the packet with the service path identifier. Service function instance 10A may forward the packet with the service index. For example, service function instance 10A may prepend network service header (NSH) to the packet, the NSH including at least one of the service path identifier and the service index. Because the prepending of the NSH can make it difficult computing devices in the underlay network to locate the fields in the original packet that would normally be used for equal cost multipath, the computing device that hosts service function instance 10A may also include an entropy label, typically encoded in a Multiprotocol Label Switching (MPLS) entropy label or a User Datagram Protocol (UDP) source port number, in the tunnel encapsulation header. In some examples, an NSH may include another service function chain identifier that, in combination the service path identifier, uniquely identifies a service function chain in a service function overlay network.

The packet with the NSH header may be further encapsulated in a tunnel encapsulation header based on encapsulation data included in a service function instance route 20 for service function instance 10C. The tunnel encapsulation header may include an IP address in the underlay network for the computing device that hosts service function instance 10C. If more than one service function instance 10 may be used as the next service function instance for a service function in a service function chain, then an anycast addresses in the underlay network or direct knowledge of the underlay network topology may be used to select the next service function instance 10 to apply the indicated service function.

Service function instance 10C receives the packet and applies its corresponding service function to the packet to further realize service function chain 28. Service function instance 10C may use an NSH included with the packet to determine a next service function instance 10 in the service chain and, in some cases, a next service index. In this case, service function instance 10C is a terminal service function instance in service chain 28. Service function instance 10C may therefore output the packet to the IP next hop for the packet in the underlay network.

In this way, service function instances 10 that receive service function data and service function chain data in service function instance routes 20 and service function chain route 21 use the service function data and service function chain data to forward, according to the overlay network, packet flows bound to the service function chain. Whereas conventional deployment models for service functions are often tightly coupled to network topology and physical resources, the techniques of this disclosure for distributing service function overlay network node and topology data in service function instance routes 20 and service function chain route 21 may enable decoupling of service function chaining from an underlying network topology of the service provider network 2. Such decoupling may simplify configuring or modifying a service function chain by reducing, and in some cases eliminating, changes to the underlying network topology that would otherwise be required to support the new service function chain. For example, to add a service function to service chain 28 to create a modified service chain, controller 19 may withdraw service function chain route 21 and output a new service function chain route that includes service function chain data describing the modified service chain.

Figure 2:
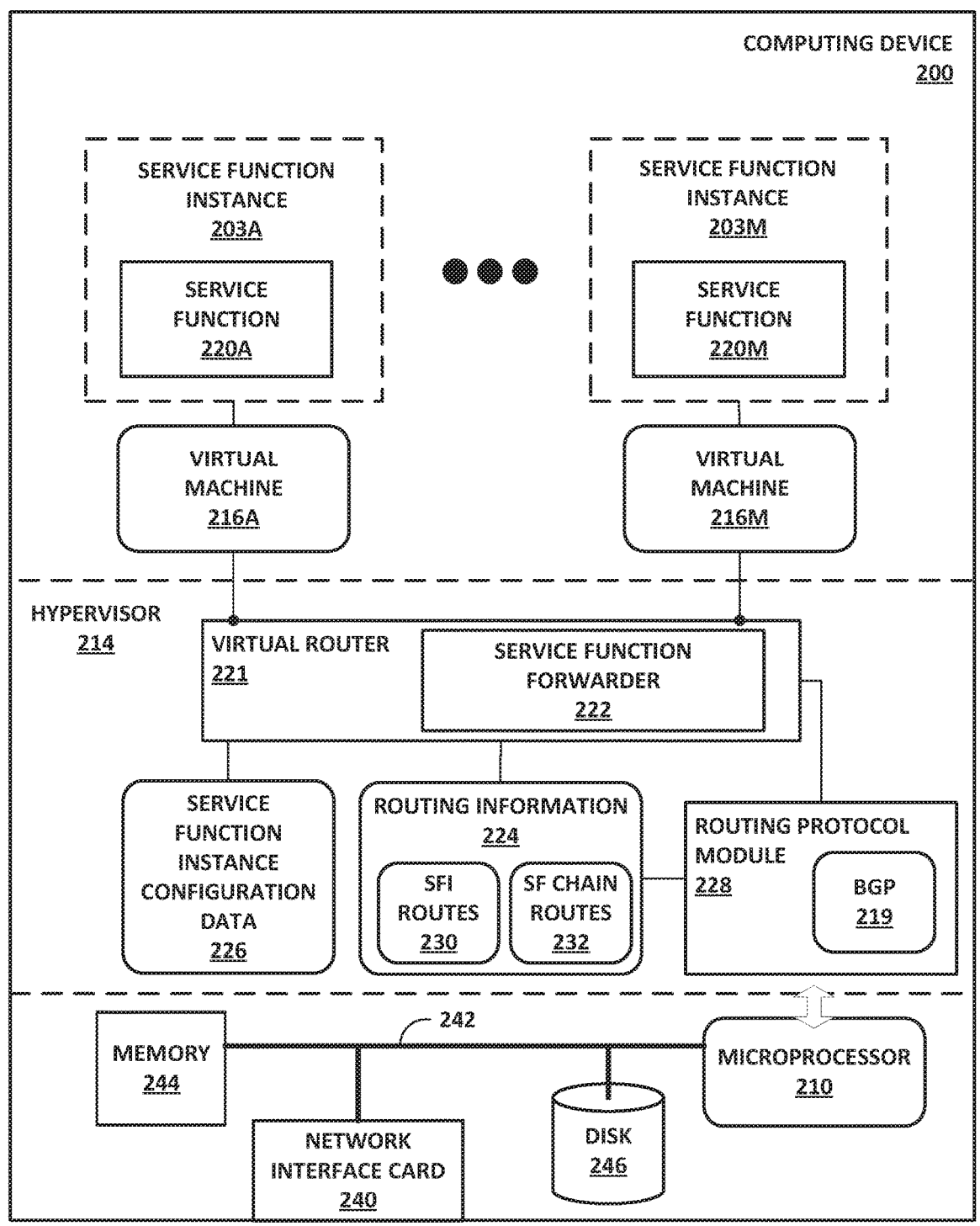
FIG. 2 is a block diagram illustrating an example computing device that provides one or more service function instances according to techniques described in this disclosure.

FIG. 2 is a block diagram illustrating an example computing device that provides one or more service function instances according to techniques described in this disclosure. Computing device 200 may represent a real or virtual server and includes in this example, a system bus 242 coupling hardware components of a computing device 200 hardware environment. System bus 242 couples memory 244, network interface card (NIC) 240, storage disk 246, and microprocessor 210. Network interface card 240 includes one or more interfaces configured to exchange packets using links of an underlying physical network. Microprocessor 210 may include one or more processors each including an independent execution unit to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 244, NIC 240, storage disk 246, and microprocessor 210 provide an operating environment for a software stack that executes a hypervisor 214 and one or more virtual machines 216A-110M (collectively, "virtual machines 216"). While illustrated and described with respect to virtual machines, service function instances 203 may be executed by other operating environments, such as containers (e.g., a DOCKER container). An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

Computing device 200 executes a hypervisor 214 to manage virtual machines 216. Example hypervisors include Kernel-based Virtual Machine (KVM) for the Linux kernel, Xen, ESXi available from VMware, Windows Hyper-V available from Microsoft, and other open-source and proprietary hypervisors.

Virtual machines 216 host corresponding service function instances 203A-203M (collectively, "service function instances 203"). Each of service function instances 203 may represent an example instance of a service function instance 10 of FIG. 1. In some examples, a virtual machine 216 may host one or more service function instances 203. Service function instances 203 are described hereinafter with respect to service function instance 203A. Service function instance 203 includes service function 220A for application to packet flows. Some examples of computing device 200 host only one service function instance 203.

Service function 220A represents software that may apply any one of the aforementioned service functions described above with respect to service function instances 10. Service function instance 203A may be orchestrated by a controller, such as controller 19, to be executed by virtual machine 216A to apply service function 220A. Service function instance configuration data 226 includes data describing service function instance 203A. Service function instance configuration data 226 may specify the service function type of service function 220A and a service identifier for service function instance 203A, for example. Service function instance configuration data 226 may further describe a virtual machine tap or other identifier for virtual machine 216A that enables virtual router 221 to direct received packets to virtual machine 216A for processing using service function instance 203A.

Hypervisor 214 in the example computing device 200 provides an operating environment for a routing protocol module 228, which may represent a process that executes various protocols at different layers of a network stack. In the example of FIG. 2, network protocols include the Border Gateway Protocol (BGP) 219, which is a layer 3 routing protocol. BGP 219 may include Multiprotocol BGP (MP-BGP). Routing protocol module 228 may execute other protocols not shown in FIG. 2, such as an MPLS label distribution protocol and/or other MPLS protocols. Routing protocol module 228 is responsible for the maintenance of routing information 224 to reflect the current topology of a network to which computing device 200 is connected via NIC 240. In particular, BGP 219 updates routing information 224 to accurately reflect the topology of the network and other entities based on routing protocol messages received by computing device 200.

In accordance with techniques described in this disclosure, routing protocol module 228 uses BGP to send and receive service function routes that distribute service function instance data and service function chain data for describing service function overlay network nodes and topology. Routing protocol module 228 may receive one or more service function instance (SFI) routes 230 and one or more service function chain routes 232 and store the service function routes to routing information 224. Service function instance routes 230 and service function chain routes 232 may represent instances of service function instance routes 20 and service function chain route 21 of FIG. 1.

Routing protocol module 228 may generate and output service function instance routes 230 to advertise service function instances 203 of computing device 200. That is, routing protocol module 228 may originate such service function instance routes 230. For example, routing protocol module 228 may obtain, for service function instance 203A, the service function type of service function 220A and the service identifier for service function instance 203A from service function instance configuration data 226. Routing protocol module 228 may generate a service function instance route from the service function type and service identifier and output the service function instance route via network interface card 240.

Virtual router 221 of hypervisor 214 may manage one or more virtual networks configured for computing device 200, such as an overlay network for service function instances 203. Additional description of a virtual router is found in U.S. patent application Ser. No. 14/226,509, filed Mar. 26, 2014, which is incorporated by reference herein in its entirety. Packets received by the network interface card 240, for instance, from an underlying physical network may include an outer header to allow the physical network to tunnel the payload or "inner packet" to a physical network address for NIC 240 of computing device 200 that executes the virtual router 221. The outer header may include not only a physical network address of NIC 240 of the computing device but also a network service header. Aspects of virtual router 221 may be executed in user space rather than in hypervisor 214. For instances, aspects of virtual router 221 including aspects of service function forwarder 222 may be executed by virtual machines 216.

Service function forwarder 222 provides a service function data plane and determines forwarding of packets according to service function chains in accordance with techniques described herein. In some examples, computing device 200 may include a separate instance of service function forwarder 222 for each service function instance 203. Service function forwarder 222 may be executed in part, in some examples, by specialized hardware designed to support virtual networking. Service function forwarder 222 may be executed by an application in user space rather than in hypervisor 214.

Service function forwarder 222 may be conceptualized as a portal in the underlay network through which service function instances 203 may be reached. Note that while service function forwarder 222 and routing protocol module 228 are illustrated and described as separate modules, operations of routing protocol module 228 to import and export and process routes, e.g., may be considered control plane operations of service function forwarder 222. In addition, as used herein, the term "service function forwarder" may refer to computing device 200 as a whole as such operations relate to service function route import/export/selection, packet forwarding in the service overlay network, and so forth, but excluding the operations of service function instances 203.

When service function forwarder 222 receives a service function chain route, service function forwarder 222 may determine whether to import the service function chain route based on the route target. If the service function forwarder 222 imports the route, the service function forwarder 222 may determine whether it is on the described service function chain by determining whether a route distinguisher for computing device 200 is specified for any of the service indices/hops of the service function chain. If so, the service function forwarder 222 may create forwarding state for incoming packets and forwarding state for outgoing packets that have been processed by one of service function instances 203.

The service function forwarder 222 may create local forwarding state making the association between the service path identifier/service index and a specific service function instance as identified by the route distinguisher for the service function instance route and service type combination. The service function forwarder 222 may also create next hop forwarding state for packets received back from the local service function instance 203 that need to be forwarded to the next hop in the service function chain. There may be a choice of next hops. The service function forwarder 222 may install forwarding state for all potential next hops, or may make choices and only install forwarding state to a subset of the potential next hops. The installed forwarding state may change over time reacting to changes in the underlay network and the availability of particular service function instances 203. Note that service function forwarder 222 may only creates and store forwarding state for the service function chain on which it is included, in some cases. I.e., service function forwarder 222 may not maintain state for all service function chains advertised.

This selection of forwarding state includes determining from the service function chain route the service index to put in the network service header of the outbound packet. This selection may be conditional on information returned from the local service function instance 203. A service function forwarder 222 may also install forwarding state to support looping, jumping, and branching.

Network interface card 240 receives packets of packet flows. The packet flows may be classified to a service function chain that includes service function instance 203A. A packet received by network interface card 240 may include a tunnel encapsulation header that identifies the packet for processing by service function forwarder 222. Service function forwarder 222 may remove the tunnel encapsulation header. A packet to be processed by service function forwarder 222 and received from a previous service function instance (executed by computing device 200 or another computing device) may include a network service header having a service path identifier and a service index.

The service function forwarder 222 may determine service function instance 203A is to apply service function 220A to the packet, based on the network service header. For example, the service function forwarder 222 may determine the service function chain route 232 having a matching service path identifier and key the service index from the network service header to determine service function instance 203A is indicated for the service index. The service function instance 203A may be indicated for the service index in the matching service function chain route 232 using a combination of service function type and service identifier that identify the service function instance 203A. The service function instance in some cases may be indicated by the service function type only, the service function type corresponding to at least one of service functions 220. For instance, the service function instance may be indicated by the service function type only if the service identifier indicates that any service function instance that supports the service function type may apply the service function. In example instances of computing device 200 in which there is an instance of a service function forwarder 222 per service function instance 203 (e.g., only one service function forwarder 222 and one service function instance 203), the service function forwarder 222 may direct its corresponding service function instance 203 to apply a service function to a received packet without first having to determine the particular service function instance 203 to apply the service function.

Service function forwarder 222 may direct service function instance 203A to process the packet based in part on the network service header. Service function instance 203A processes the packet by applying service function 220A. In addition to or as part of processing the packet by applying the service function 220A, service function instance 203A may determine a new network service header for the packet. That is, service function instance 203A may select the next service function instance along the service chain (or another service chain) that is to process the packet. Service function 203A may select between multiple service function instances (in some cases of different service function types). The service index and service path identifier in the new network service header may indicate the next service function in the service chain, a previous service function in the chain (known as "looping"), or a service function further down the chain (known as "jumping"). The service index and service path identifier in the new network service header may alternatively indicate a service function on a different service function chain (known as "branching").

Service function forwarder 222 subsequently selects a service function instance that provides the service function denoted by the service path identifier and service index in the next network service header, and service function forwarder 222 forwards the packet to the service function forwarder that supports the selected service function instance.

The service index in the new network service header received from service function instance 203A may leave the service function forwarder 22 with a choice of next hop service function types, and service function instances for each service function types. That is, the service index indicates a set of one or more entries in the service function chain route 232 for the service path identifier, each of which corresponds to a service function type and the service identifier (e.g., route distinguisher) of a service function instance route 230 that advertised a specific service function instance. The service function forwarder 222 selects one of these service function instances, identify the service function forwarder that supports the chosen service function instance, and send the packet to that next hop service function forwarder.

In the typical case, the service function forwarder 222 chooses a next hop service function forwarder 222 based on the set of all service function forwarders that support the service functions identified by the service index and service path identifier in the new network service header (that set having been advertised in individual service function instances routes 230), finding the one or more that are "nearest" in the underlay network, and choosing between nearest next hop service function forwarders using a load balancing algorithm.

Service function instance 203A may influence this choice process by passing additional information back along with the packet and new network service header. This information may influence local policy at the service function forwarder 222 to cause it to favor a next hop service function forwarder (perhaps selecting one that is not nearest in the underlay), or to influence the load balancing algorithm.

This selection applies to the typical case as well as in the case of looping, jumping, and branching. For example, a service function forwarder 222 in a particular service overlay network (identified by a particular import RT, RT-z) may forward an NSH-encapsulated packet, the NSH having a service path identifier of SPI-x and a service index of SI-y. Service function forwarder 222 may perform the following:

1. Identify an installed service function chain route 230 that carries RT-z and that has SPI-x. (If no such route 230 is identified, then the packet may be dropped.)

2. From the service function chain attribute of the identified service function chain route, identify the service function item having a service index value of SI-y. (If there is no such service function item, the packet may be dropped.) Service function items are described in further detail below with respect to FIG. 4.

3. Identifying the matching set of service function instance routes 230 by processing the one or more service function types indicated in the identified service function item. A service function instance route matches if it carries RT-z, its service function type matches one of the service function types indicated in the identified service function item, and the service identifier (e.g., route distinguisher) value matches one of the one or more service identifiers indicated in the identified service function item. If a service identifier for a service function type is zero, then a service function instance route matches if it carries RT-z and its service function type matches the service function type. That is, any service function instance route in the service function overlay network defined by RT-z and with the correct service function type matches.

Each of the matching service function instance routes identifies a single service function instance and may contain a Tunnel Encapsulation attribute that specifies how to send a packet to that service function instance. For a packet, the service function forwarder 222 selects a particular service function instance from the set of one or more matching service function instance routes. The selection may made according to local policy of the service function forwarder 222. For instance, a policy may specify to determine the set of matching service function instances that are "nearest" in the underlay network and to load balance among them. Other policies are contemplated. Service function forwarder 222 subsequently forwards the packet to the service function forwarder that hosts the selected service function instance, e.g., based on the Tunnel Encapsulation attribute of the service function instance route for the selected service function instance.

As noted above, service function instance 203 or service function forwarder 222 may cause a packet to "loop back" to a previous service function on a service function chain such that a sequence of service functions may be re-executed. This may be achieved by replacing the service index in the network service header with an earlier (e.g., higher) value instead of setting it to a next (e.g. lower) value in the chain.

Service function instance 203 or service function forwarder 222 may alternatively cause a packet to "jump forward" to a service function on a service function chain that is not the immediate next service function in the service function chain. This may be achieved by replacing the service index in the network service header with a value that is further down the chain than would be achieved by modifying (e.g., decreasing) the value to the next (e.g., lower) value in the chain.

A more complex option to move packets from one service function chain to another is termed "branching." This mechanism allows a service function instance 203 or service function forwarder 222 to make a choice of downstream treatments for packets based on local policy and output of the local service function. Branching may be achieved by changing the service path identifier in the network service header to indicate the new chain and setting the service index to indicate the point in the new chain at which the packets should enter. (Note that the network service header does not include a marker to indicate whether a specific packet has been around a loop before. Therefore, the use of network service header metadata may be used to prevent infinite loops.)

In some examples, a special-purpose "change sequence" service function type value indicates, in a service function chain route, that the service function forwarder 222 may make a loop, jump, or branch for a packet according to the local policy and information returned by one of local service function instances 203. In some cases, the loop, jump, or branch instruction is encoded within the service identifier (e.g., route distinguisher) associated with the change sequence service function type in a service function item of the service function chain route for the current service function chain of the packet. For example, the service identifier may encode 3 bytes for a service path identifier and 2 bytes for a service index to specify the loop, jump, or branch information. If the encoded service index is not part of the service function chain route indicated by the encoded service path identifier, then this may indicate an error detectable by the service function forwarder 222 when it parses the indicated service function chain route. Service function forwarder 222 may eschew installing forwarding state for the service function chain route and packets received with the service path identifier that indicates this service function chain route may be discarded.

If the service path identifier in this encoding is unknown, the service function forwarder 222 may eschew installing any forwarding state for this service function chain route, but may hold the service function chain route pending receipt of another service function chain route that does use the encoded service path identifier.

If the service path identifier matches the current service path identifier for the chain as indicated in the network service header, the instruction is a loop or jump. In this case, if the service index is previous (e.g., greater) to the current service index, it is a loop. If the service path identifier matches and the service index is subsequent (e.g., lesser) to the next service index, it is a jump.

If the service path identifier indicates another chain, this is a branch and the service index indicates the point at which to enter the other chain. The change sequence service function type may appear in a set of service identifier/service function type tuples for a service function item at a service index and may be selected in the manner described above. Special purpose service function types such as the change sequence service function type may not be advertised in service function instance routes in some cases.

Support for looping and jumping requires that the service function forwarder 222 has forwarding state established to another service function forwarder that provides access to a service function instance of the appropriate service function. This means that the service function forwarder 222 should have received the relevant service function instance routes 230 and created the forwarding state. This may be a matter of local configuration and implementation. For example, an implementation could be configured to install forwarding state for specific looping/jumping.

Support for branching requires that the service function forwarder 222 has forwarding state established to another service function forwarder that provides access to a service function instance of the appropriate service function on the other service function chain. This means that the service function forwarder 222 should have received the relevant service function instance routes 230 and service function chain routes 232 and created the forwarding state. This may be a matter of local configuration and implementation. For example, an implementation could be configured to install forwarding state for specific branching (identified by service path identifier and service index).

Figure 3:
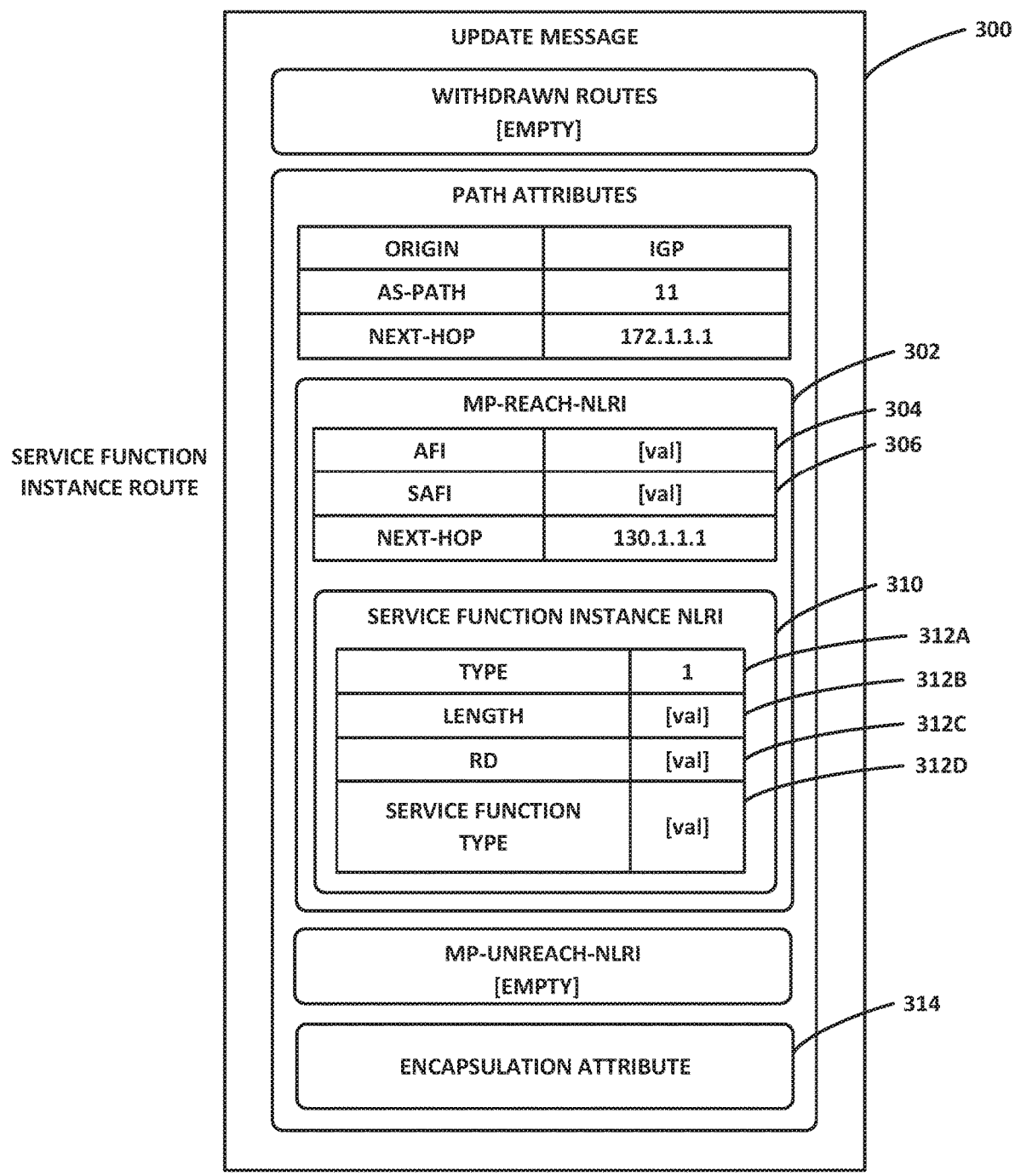
FIG. 3 is a block diagram illustrating an example layer 3 routing protocol route advertisement that includes, in accordance with techniques described herein, service function instance data that describes a service function instance.

FIG. 3 is a block diagram illustrating an example layer 3 routing protocol route advertisement that includes, in accordance with techniques described herein, service function instance data that describes a service function instance. BGP UPDATE message 300 conforms to MP-BGP and includes MP-REACH-NLRI 302 advertising service function instance data for a service function instance in service function chaining Network Layer Reachability Information (NLRI) 310. BGP UPDATE message 300 may represent an example instance of service function instance routes 20 illustrated in FIG. 1 and service function instance routes 230 illustrated in FIG. 2. For purposes of illustration, BGP UPDATE message 300 is illustrated using glyphs, rather than with packet fields.

MP-REACH-NLRI 302 of BGP UPDATE message 300 includes an Address Family Identifier (AFI) 304 and a Subsequent AFI (SAFI) 306 to identify service function chaining NRLI 310 as carrying service function instance data or service function chain data. Values for AFI 304 and SAFI 306 may be assigned by a private party or by the Internet Assigned Numbers Authority (IANA).

Service function chaining NLRI 310 includes service function instance data that describes a service function instance. A value for type 312A indicates whether service function chaining NLRI 310 is for a service function instance route or a service function chain route. Here, the example value of 1 indicates service function chaining NLRI 310 is for a service function instance route. Length 312B indicates the length of the service function chaining NLRI 310 (e.g., in octets). Route Distinguisher (RD) 312C may specify a service identifier for a service function instance that, at least in combination with a value indicated by service function type 312D, uniquely identifies a service function instance in a service function overlay network. RD 312C may be a Type 1 Route Distinguisher, as described in RFC 4364. As such, RD 312C may include a first part that is a loopback address of a computing device that originates BGP UPDATE message 300, and a second part that is generated by the originating computing device. RD 312C may therefore usable for distinguishing among service function chaining NLRI in the network. Two service function instances of the same service function type may be associated in respective service function instance routes with different route distinguishers, where the association of a service function instance with a route distinguisher may be determined by provisioning. If two service function instance routes are originated from different administrative domains, they must have different route distinguishers in some examples. For instance, service function instance routes from different virtual private networks (VPNs) for different service overlay networks must have different route distinguishers, which must be different from any non-VPN service function instance routes.

Service function type 312D indicates a service function type for the service function instance described by service function chaining NRLI 310. Some instances of BGP UPDATE message 300 may include multiple service function chaining NRLI 310 for multiple service function instances hosted by a computing device. In some examples, a routing process may perform route key processing for service function chaining NLRI 310 using only a combination of RD 312C and service function type 312D. In some example, any combination of data included in service function chaining NLRI 310 may be used.

Encapsulation attribute 314 is a path attribute that includes tunnel encapsulation data. The tunnel encapsulation data may include an IP address for a computing device that hosts the service function instance(s) described by service function chaining NRLI 310. The tunnel encapsulation data may further include other data usable by a computing device that receives BGP UPDATE message 300 for generating an encapsulated packet for forwarding to the computing device that hosts the service function instance(s). Example details of an encapsulation attribute are described in "The BGP Tunnel Encapsulation Attribute," Inter-Domain Routing Working Group, Internet Engineering Task Force, May 31, 2016, available at https://tools.ietf.org/html/draft-ietf-idr-tunnel-encaps-02, which is incorporated by reference herein in its entirety.

Each computing device that hosts a service function instance may originate a service function instance route for each service function instance that the computing device hosts. A single BGP UPDATE message 300 may include multiple instances of service function chaining NLRI 310 representing respective service function instance routes for respective service function instances. As such, BGP UPDATE message 300 may include multiple "service function instance routes" each having service function instance data that includes an instance of service function chaining NLRI 310 and also includes the encapsulation attribute 314.

Figure 4:
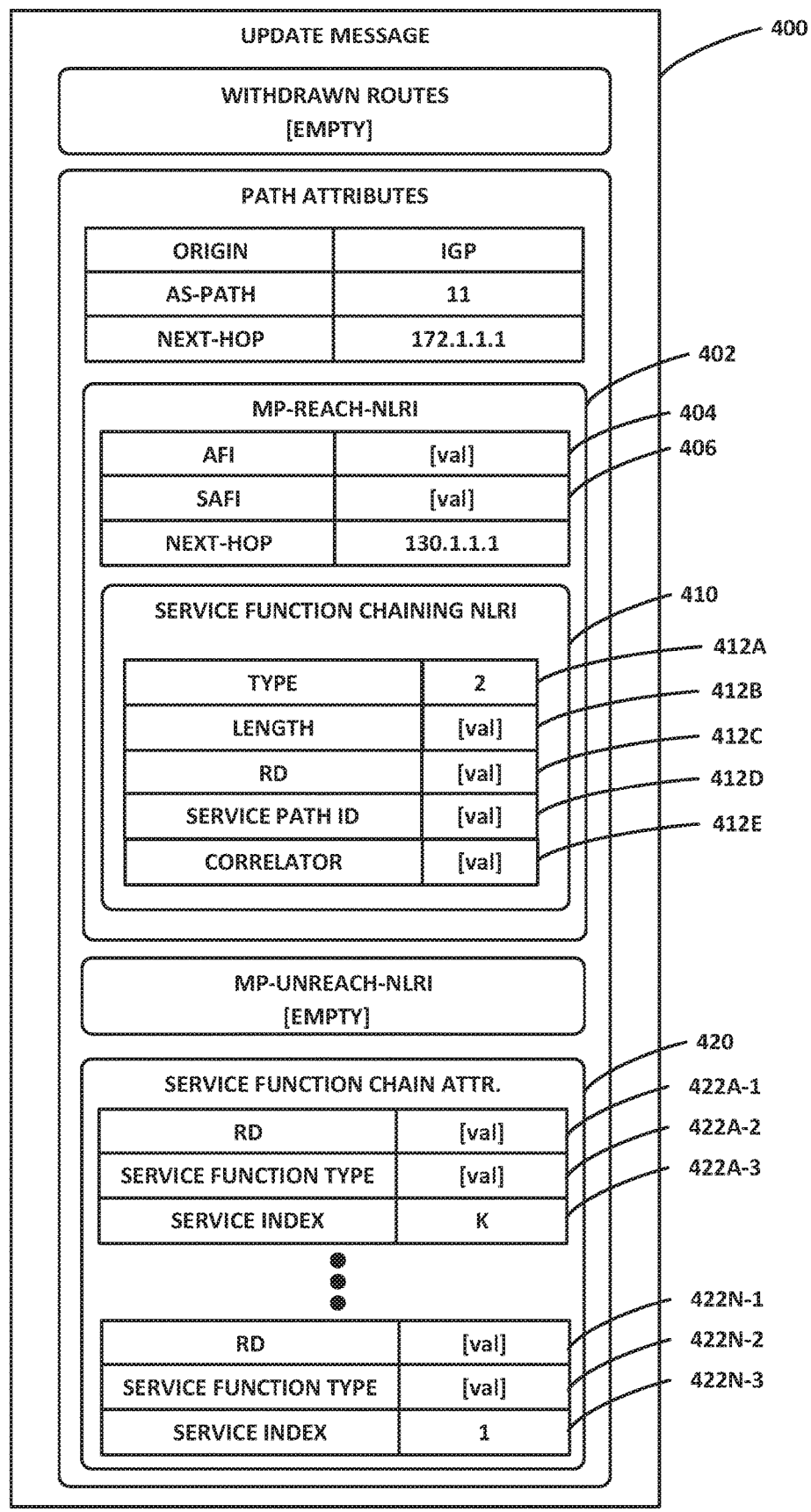
FIG. 4 is a block diagram illustrating an example layer 3 routing protocol route advertisement that includes, in accordance with techniques described herein, service function chain data that describes a service function chain.

FIG. 4 is a block diagram illustrating an example layer 3 routing protocol route advertisement that includes, in accordance with techniques described herein, service function chain data that describes a service function chain. BGP UPDATE message 400 conforms to MP-BGP and includes MP-REACH-NLRI 402 advertising service function chain data in service function chaining Network Layer Reachability Information (NLRI) 410. BGP UPDATE message 400 may represent an example instance of service function chain route 21 illustrated in FIG. 1 and service function chain routes 232 illustrated in FIG. 2. For purposes of illustration, BGP UPDATE message 400 is illustrated using glyphs, rather than with packet fields.

MP-REACH-NLRI 402 of BGP UPDATE message 400 includes an Address Family Identifier (AFI) 404 and a Subsequent AFI (SAFI) 406 to identify service function chaining NRLI 410 as carrying service function instance data or service function chain data. Values for AFI 404 and SAFI 406 may be assigned by a private party or by the Internet Assigned Numbers Authority (IANA) and may be the same as those assigned for AFI 304 and/or for SAFI 306.

Service function chaining NLRI 410 includes service function chain data that describes a service function chain in a service function overlay network. A value for type 412A indicates whether service function chaining NLRI 410 is for a service function instance route or a service function chain route. Here, the example value of 2 indicates service function chaining NLRI 410 is for a service function chain route. Length 412B indicates the length of the service function chaining NLRI 410 (e.g., in octets). A value for Route Distinguisher (RD) 412C in combination with a value indicated by service path identifier 412D uniquely identifies a service function chain in a service function overlay network. RD 412C may be a Type 1 Route Distinguisher. As such, RD 412C may include a first part that is a loopback address of a computing device that originates BGP UPDATE message 400, and a second part that is generated by the originating computing device. RD 412C may therefore may therefore usable for distinguishing service function chaining NRLI 410 in the network. The association of a service function chain and a route distinguisher may be determined by provisioning. If two service function instance routes are originated from different administrative domains, they must have different route distinguishers in some examples. For instance, service function chain routes from different virtual private networks (VPNs) for different service overlay networks must have different route distinguishers, which must be different from any non-VPN service function chain routes.

Service path identifier 412D indicates an identifier for the service function chain described by service function chaining NRLI 410. The service path identifier 412D may be a 24-bit value in some examples. In some examples, a routing process may perform route key processing for service function chaining NLRI 410 using only a combination of RD 412C and service path identifier 412D. In some example, any combination of data included in service function chaining NLRI 410 may be used.

Correlator 412E indicates a correlation value for the service function chaining NLRI 410. A controller that generates service function chain routes may set a common correlation value in correlator 412E to correlate a forward service function chain route and a reverse service function chain route for a forward packet flow and reverse packet flow, respectively, or to otherwise associate the service function chain route with another service function chain route. To indicate another service function chain route, correlator 412E may include the service path identifier for the other service function chain route and a value of the route distinguisher with which the other service function chain route is advertised.

In some examples, correlator 412E is included in service function chain attribute 420. A service function chain route may include multiple instances of correlator 412E to associate the service function chain route with multiple other service function chain routes. Correlator 412E may in some cases indicate a type of correlation or association, such as the association of two unidirectional service function chains to form a bidirectional service function chain. Correlator 412E may in some cases represent one or more association type-length-values (TLVs) that each includes the service path identifier for the other service function chain route and a value of the route distinguisher with which the other service function chain route is advertised.

Service function instances may process the forward packet flow using the forward service function chain route and process the reverse packet flow using the reverse service function chain route. Based on the common correlation value for the forward service function chain route and a reverse service function chain route, service function instances may ensure that a packet flow that is load-balanced to a particular service function instance indicated in the forward service function chain route in the forward direction is also load-balanced to the same service function instance in the reverse direction. The controller may in this way use the correlator 412E to direct a forward packet flow and corresponding reverse packet flow to the same service function instance. This technique may enable the service function instance to perform stateful processing, e.g., on the forward packet flow and corresponding reverse packet flow, which may be useful for certain service functions, such as firewall.

It may be useful to create bidirectional service function chains to enable packet flows to traverse the same set of SFs, but in the reverse order. However, packets on service function chains in the data plane may not contain a direction indicator, so each direction may use a different service path identifier. If an association type indicates "Bidirectional service function chain," then the service function chain advertised in the service function chain route is one direction of a bidirectional pair of service function chains where the other in the pair is advertised in the service function chain route with service identifier (e.g., route distinguisher) indicated by the association. The service path identifier carried in the associated service path identifier field of the association provides a cross-check and should match the service path identifier advertised in the service function chain route with service identifier as indicated in the association.

Because service function chain routes reference each other, one service function chain route advertisement will be received before the other. Therefore processing of an association will require that the first service function chain route is not rejected simply because the associated service function chain route service identifier it carries is unknown. However, the service function chain defined by the first service function chain route is valid and should be available for use as a unidirectional service function chain even in the absence of an advertisement of its partner.

Furthermore, in error cases where service function chain route-a associates with service function chain route-b, but service function chain route-b associates with service function chain route-c such that a bidirectional pair of service function chains cannot be formed, the individual service function chains are still valid and should be available for use as unidirectional service function chains. An implementation should log this situation because it may represent a controller error.

Usage of a bidirectional service function chain may be programmed into the classifiers by the controller. Alternatively, a classifier may look at incoming packets on a bidirectional packet flow, extract the service path identifier from the received NSH, and look up the service function chain route to find the reverse direction service function chain to use when it sends packets.

BGP UPDATE message 400 in this example includes a service function chain attribute 420 to list one or more service functions in the service function chain identified by service function chaining NLRI 410. The service function chain attribute 420 may be an optional and transitive BGP Path Attribute. In some example implementations, the list of service functions may be included in service function chaining NLRI 410 or another attribute of BGP UPDATE message 400. Service function chain attribute 420 may be a BGP Path attribute and may apply to multiple service function chaining NLRI 410. Each of service function items 422A-422N indicates one or more service function instances using a combination of route distinguisher and service function type in this example, where the route distinguisher is an example of a service identifier. A service index indicates a location or order for the service function in the service function chain order. For example, service function item 422A is indicated by RD 422A-1, service function type field 422A-2 indicating a service function type, and a service index 422A-3.

Each service index 422A-3-422N-3 may be mapped to one or more service functions that are implemented by one or more service function instances (SFIs) that support the specified service functions. Thus, a service index may represent a choice of SFIs of one or more service function types. By deploying multiple SFIs for a single SF, a service network operator may provide load balancing and redundancy.

For service function item 422A, e.g., one or more designated route distinguisher values for RD 422A-1 may indicate that any service function instance that supports the service function type indicated by service function field 422A-2 may be selected to process a packet flow classified to the service function chain described by service function chaining NLRI 410. For example, if RD=0, a previous service function instance in the service function chain (or a classifier), may select any service function instance to apply the service function indicated by service function field 422A-2.

Multiple service function items 422 may have a common service index. In such instances, a previous service function instance in the service function chain (or a classifier), may select any of the service function instances indicated by the multiple service function items 422 to apply the service function. In this example of service function chain attribute 420, the service indices for service function items 422 contiguous in the list descend in value or are the same. Service indices may be 8-bit values and have values [0-225] in some examples. Service indices in some examples are not necessarily contiguous (e.g., service function items 422 may have respective service indices 255, 250, 250, 220, etc.) in order to permit easy modification to the service function chain attribute 420 to insert new service function items 422 into gaps between service indices.

In some examples, each of service function items 422 represents a type-length-value (TLV) that contains all of the information about a single hop or index in the service function chain for the service function chain route. This TLV is referred to as a "hop TLV" and has a value that includes a service index value and one or more service function type TLVs. Each service function type TLV indicates a service function type and includes a service function instance reference for each of one or more instances of a service function that is allowed at this service index of the service function chain for the service function type. Each service function instance may be indicated using the route distinguisher with which the service function instance is advertised. A special route distinguisher value (e.g., zero) may indicate that any service function instance of the service function type may be used. In such examples, a service index may be permitted at most once in a given service function chain route.

The service function type is used to identify a service function instance route in the service function overlay network which, in turn, will allow lookup of routes to service function instances implementing the service function. In some case, some service function type values are special-purpose service function type values and have special meanings, such as the 'change sequence' type described above.

The term "service function chain route" may refer to service function chain data that includes the service function chaining NLRI 410 and service function chain attribute 420. Service function instances and other BGP speakers may exchange BGP Capabilities Advertisements with BGP peers to indicate a capability of processing BGP UPDATE messages that include service function chaining NLRI (e.g., of processing NLRI having the AFI/SAFI values for a service function chain data address family). The BGP Capabilities advertisement may use capability code for MP-BGP with an AFI and SAFI for the service function chain data address family.

Multiple service function chain routes may include the same service function instance (as described by a service function instance route). When two service function chain routes have the same service path identifier but different route distinguishers for the service function chain route, there can be three cases:

(1) Two or more controllers are originating service function chain routes for the same service function chain. In this case the service function chain the content of the service function chain routes is identical and the duplication is to ensure receipt and to provide Controller redundancy.

(2) There is a transition in content of the advertised service function chain and the advertisements may originate from one or more controllers. In this case the content of the service function chain routes will be different.

(3) The reuse of a service path identifier may result from a configuration error.

In all cases, there is no way for the receiving service function forwarder to know which service function chain route to process, and the service function chain routes could be received in any order. At any point in time, when two service function chain routes have the same service path identifier but different route distinguishers, the service function forwarder may select the service function chain route, such as by selecting the one with the numerically lowest route distinguisher.

In some examples, service function instance routes and service function chain routes may include Route Target attributes to restrict import of the routes only to those service function instances configured to import the specified route target into one or more virtual routing and forwarding instances (VRFs). In such examples, the network services provider that operates the service function overlay network may configure multiple service function overlay networks over a common underlay network using layer 3 virtual private network (L3VPN) or Ethernet VPN instances by configuring, in service function instances, VRFs with export and import route targets to realize the L3VPN or EVPN instances. A set of one or more RTs is assigned to a particular service function overlay network instance. All service function instance route and service function chain route advertisements are tagged with the assigned export Route Targets and hence these routes will only be imported by those computing devices hosting service function instances and that have one or more matching import Route Targets. This allows building multiple service function overlay networks and instantiating service function chains within an L3VPN or EVPN instance. A service function forwarder that imports more than one Route Target may be present in multiple service function overlay networks and may maintain separate forwarding state for each overlay network (e.g. using separate VRFs).

The following describes example service function instance routes and service function chain routes and forwarding packet flows according to the service function chain routes, according to some examples of techniques described in this disclosure.

Assume the following service function instance routes:
RD1, RD2, RD3, RD4; SF1
RD1, RD2, RD3, RD4; SF2
RD1, RD2, RD3, RD4; SF3
RD1, RD2, RD3, RD4; SF4

In this above example, a service function type SF1 is supported by four different service function instances each distinguished by a different service identifier, here, RD1, RD2, RD3, and RD4. RD1 and SF1 may be indicated by fields 312C, 312D of a BGP UPDATE message 300 for the service function instance route for the service function instance identified by the combination of RD1 and SF1.

Assume also the following service function chain routes:
SFC1: [RD=0, SF1, SI=255], [RD=0, SF3, SI=250]
SFC2: [RD=0, SF1, SI=255], [RD=2, SF3, SI=250]

The service function chain SFC1 consists of SF1 followed by SF3 (SI denotes service index). The notation [RD, SF, S1] may denote a route distinguisher (RD), service function (SF), and service index (SI) in an example of any of service function items 422 for a service chain. A classifier may load balance received packet flows for SFC1 among service function instances that support SF1 and are equidistant and closest to the classifier (which may itself be a service function instance at the perimeter of the service function overlay network). An SF1 service function instance may load balance the flows it received for SFC1 among service function instances that support SF3 and are equidistant and closest to the SF3 service function instance. An SF3 service function instance may send each packet of any packet flows it receives for SFC1 to the next hop to the destination IP address that is in the inner IP packet header for the packet.

The service function chain SFC2 consists of SF1 followed by SF3. A classifier may load balance received packet flows for SFC2 among service function instances that support SF1 and are equidistant and closest to the classifier. An SF1 service function instance may send all packet flows received for SFC2 to the service function instance identified by the combination of [RD2, SF3]. (RD2 is a shorthand notation for RD=2.) The [RD2, SF3] service function instance may send each packet of any packet flows it receives for SFC2 to the next hop to the destination IP address that is in the inner IP packet header for the packet.

Assume also the service function chain route:
SFC3: [RD=1, SF1, SI=255], [RD=4, SF1, SI=255], [RD=2, SF3, SI=250], [RD=3, SF3, SI=250], [RD=0, SF4, SI=200]

The service function chain consists of SF1 followed by SF3 and SF4. Because of the common service index 255, a classifier would send all received packet flows for SFC3 to either of the service function instances identified by [RD1, SF1] and [RD4, SF1], whichever is closest in the underlay network. If the service function instances are equidistant, the classifier may load balance its received packet flows for SFC3 between the SF1 service function instances. An SF1 service function forwarder would send all of all received packet flows for SFC3 flows to either of the service function instances identified by [RD2, SF3] or [RD3, SF3], whichever is closest in the underlay network. If the service function instances are equidistant, the SF1 service function instance may load balance its received packet flows for SFC3 between the SF3 service function instances. Because RD=0 is used in this example to indicate that supported SF4 service function instance may be used, an SF3 service function instance may load balance received packet flows among those SF4 service function instances that are equidistant and closest to the SF3 service function instance. An SF4 service function instance may send each packet of any packet flows it receives for SFC2 to the next hop to the destination IP address that is in the inner IP packet header for the packet.

In some cases, a controller may output SFC3 having a correlator value X and an SFC4 also having correlator value X, where SFC3 and SFC4 are the reverse service function chain of the other:
SFC4: [RD=2, SF3, SI=255], [RD=3, SF3, SI=255]

Because SFC3 and SFC4 have a common correlator value, a destination node receiving an SFC3 packet flow may send its replying SFC4 flow to either of the service function instance identified by [RD2, SF3] and [RD3, SF3], whichever is closest in the underlay network. If the service function instances are equidistant, the destination node may load balance between the two. Note that the source and destination IP addresses in the inner IP packet header are reversed in the SFC4 flow. An SF3 service function instance would send an SFC4 flow to the next hop to the destination IP address that is in the inner IP packet header for the packet.

As denoted above, parallel service function instances may be specified at any point in a service function chain by specifying multiple service functions with the same service index. For example, for N server load balancers, service function chain route may include N service function tuples each having have the same service index value, one for each server load balancer. The preceding service function instance or nodes in the service function chain may then load balance flows among those server load balancers that were equidistant from the node(s) in the underlay network.

A bi-directional service function chain may be represented by two service function chain routes. Each route may have the same set of tuples but with the order reversed. For both unidirectional and bidirectional service function chain routes, the service function tuples are ordered by decreasing (or increasing in some examples) or equal service index value. Service index values may have meaning only relative to a specific service function chain. Service index values may decrease (or increasing in some examples) monotonically from the start to the end of the service function chain.

Figure 5:
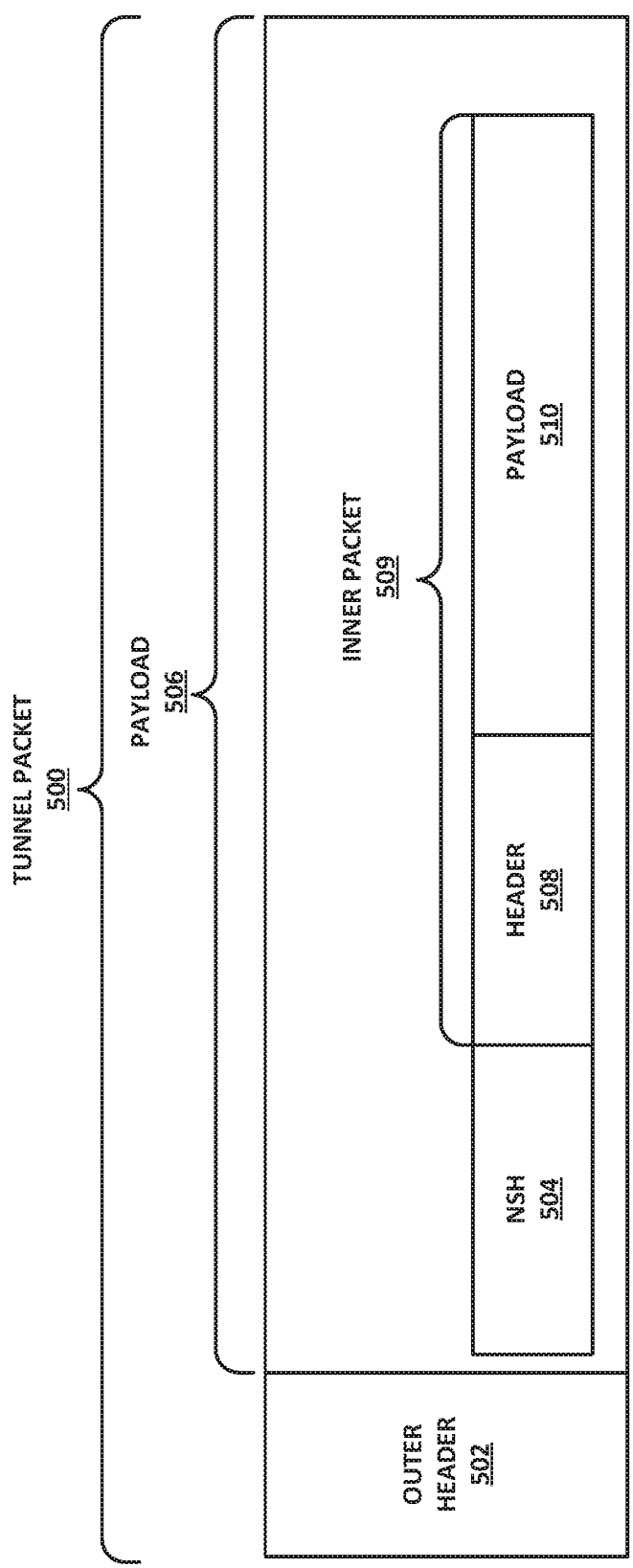
FIG. 5 illustrates an example tunnel packet to steer an inner packet along a service function chain, in accordance with techniques of this disclosure.

FIG. 5 illustrates an example tunnel packet to steer an inner packet along a service function chain, in accordance with techniques of this disclosure. In the example of FIG. 5, an original inner packet 509 having header 508 and payload 510 is prepended with a network service header 504 and encapsulated as payload 506 using outer (or encapsulation) header 502 to form tunnel packet 500.

Outer header 502 may include tunnel encapsulation data advertised in encapsulation attributes 314 or otherwise included in service function instance routes. Outer header 502 enables the underlay network to forward tunnel packet 500 to a computing device that hosts a service function instance identified in network service header 504.

Network service header 504 may include a service path identifier that identifies a service function chain. In some examples, network service header 504 may include a service path identifier and another service function chain identifier that identify a service function chain in combination. Network service header 504 may further include a service index that identifies a next service function in the service function chain to be applied.

A computing device that receives tunnel packet 500 may determine a service function instance hosted by the computing device to process the inner packet 509, based on a service function instance route stored by the computing device that describes the service function chain identified by the network service header 504.

In some cases, network service header 504 may include one or more Multiprotocol Label Switching (MPLS) labels of an MPLS stack or other tunnel identifiers for a tunneling protocol (e.g., Generic Route Encapsulation). Such a network service header 504 may be considered a "logical" network service header. The one or more MPLS labels or other tunnel identifiers may include the service path identifier and service index, using any combination of bits. For example, the label value of a first MPLS label attached to or otherwise encapsulating inner packet 509 may include the service path identifier and the label value of a second MPLS label attached to the inner packet 509 may include the service index. As another example, the label value of an MPLS label attached to inner packet 509 may include both the service path identifier and the service index.

Figure 6:
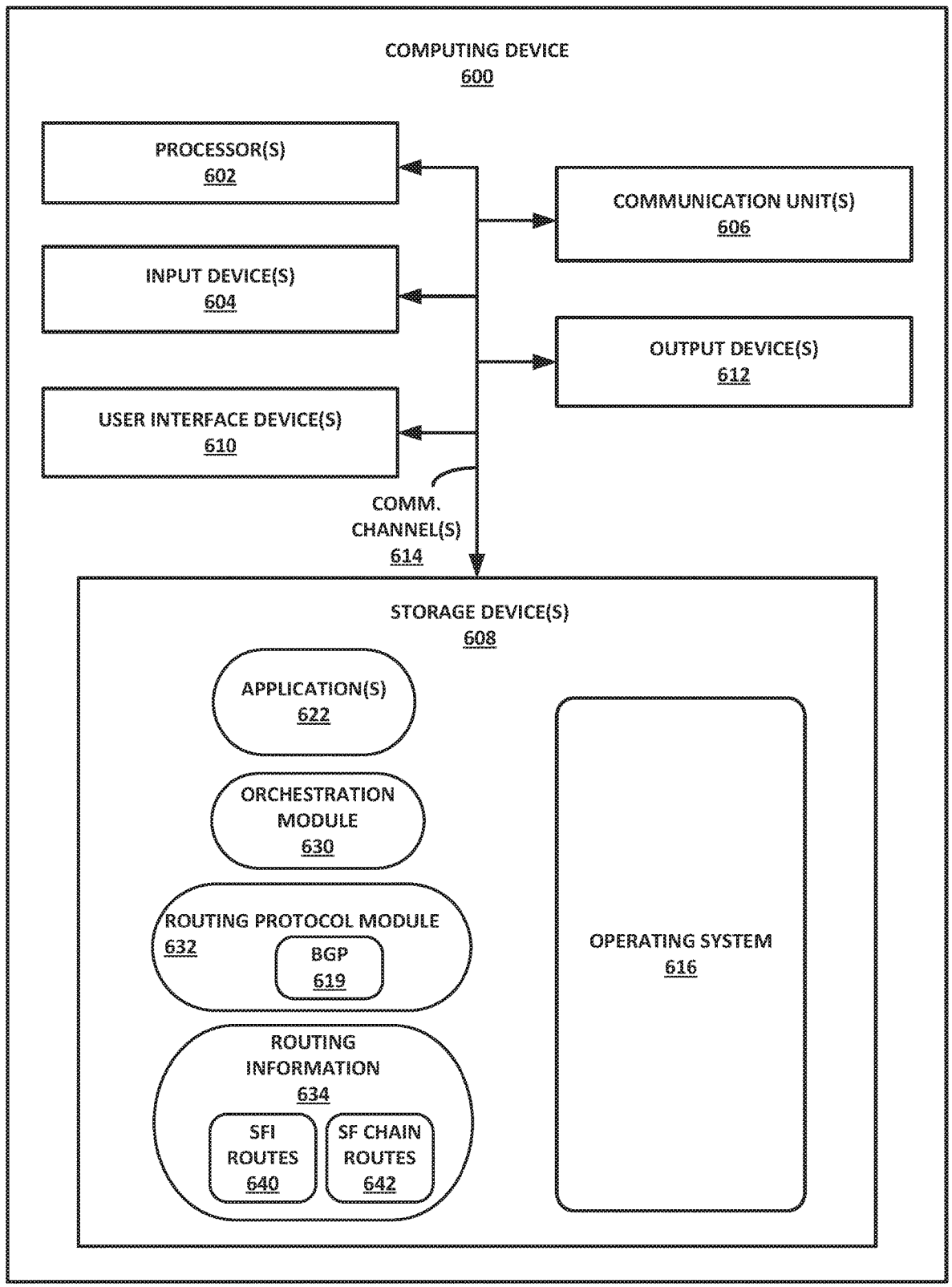
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 600 that includes one or more processor(s) 602 for executing any one or more of controller 19, service function instance 10, or any other computing device described herein. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the specific example of FIG. 6 computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, orchestration module 630, routing protocol module 632, operating system 616 that are executable by computing device 600. Computing device 600 further includes routing information 634. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks.

Communication units 606 may include a network interface card, such as an Ethernet card, an optical transceiver, a radio frequency transceiver, or any other type of device that can send and receive information. Other examples of such network interfaces may include 3G and WiFi radios. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications with processors 602, communication unit 606, storage device 608, input device 604, user interface devices 610, and output device 612.

Orchestration module 630 may orchestrate service function instances in a service function overlay network and generate service function chains. A network service provider operator may configure the service function chains using user interface devices 610 and/or input devices 604.

Routing protocol module 632 may represent a process that executes various protocols at different layers of a network stack. In the example of FIG. 6, network protocols include the Border Gateway Protocol (BGP) 619, which is a layer 3 routing protocol. BGP 219 may include Multiprotocol BGP (MP-BGP). Routing protocol module 632 may execute other protocols not shown in FIG. 6, such as an MPLS label distribution protocol and/or other MPLS protocols. Routing protocol module 632 is responsible for the maintenance of routing information 634 to reflect the current topology of a network to which computing device 600 is connected via one of communication units 606. In particular, BGP 619 updates routing information 634 to accurately reflect the topology of the network and other entities based on routing protocol messages received by computing device 600.

In accordance with techniques described in this disclosure, routing protocol module 632 uses BGP to send receive service function routes that distribute service function instance data and service function chain data for describing service function overlay network nodes and topology. Routing protocol module 632 may receive one or more service function instance routes 640 and may receive one or more service function chain routes 642 and store the service function routes to routing information 634. Service function instance routes 640 and service function chain routes 642 may represent instances of service function instance routes 20 and service function chain route 21 of FIG. 1.

Using service function instance routes 640 received or generated by computing device 600, routing protocol module 632 may generate and output service function chain routes 642 to advertise service function chains configured for a service function overlay network controlled at least in part by computing device 600. That is, routing protocol module 632 may originate such service function chain routes 642 and inject the routes into the service function overlay network.

Figure 7:
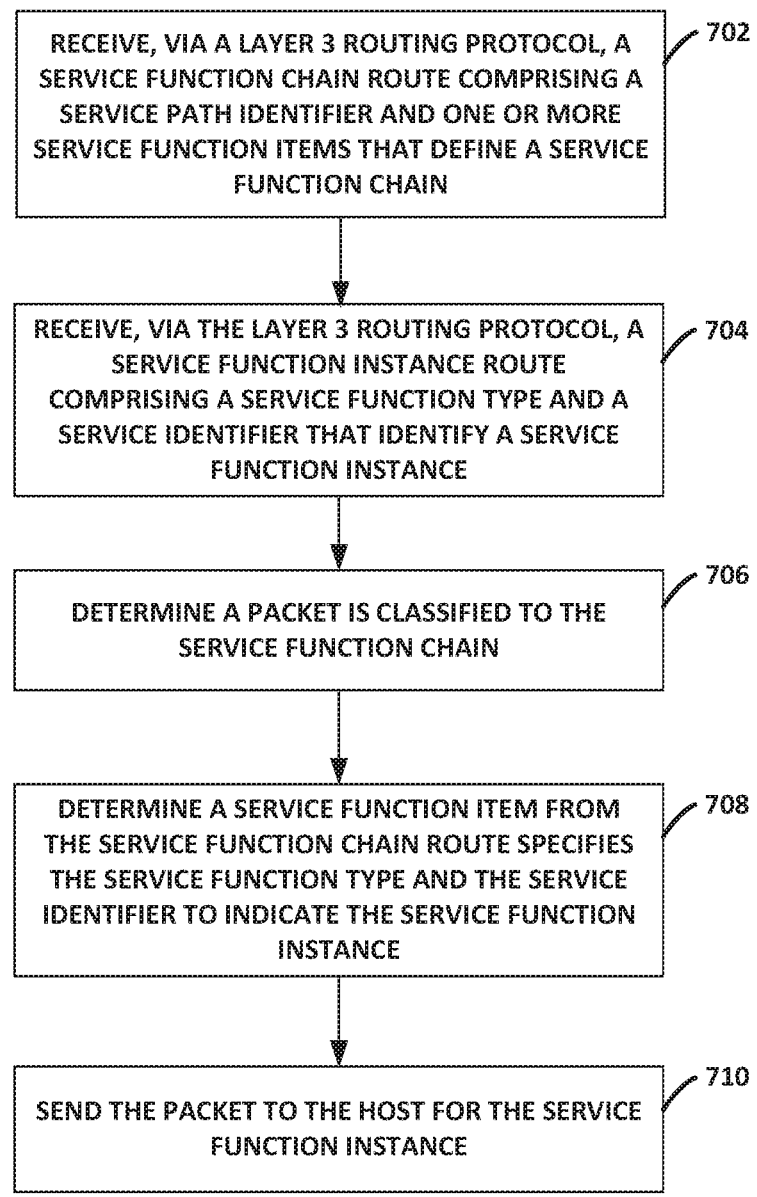
FIG. 7 is a flowchart illustrating an example mode of operation for a service function instance, according to techniques of this disclosure.

FIG. 7 is a flowchart illustrating an example mode of operation for a service function instance, according to techniques of this disclosure. Operation 700 is described with respect to computing device 200 of FIG. 2 but may be performed by any computing or network device.

Computing device 200 receives a service function chain route that includes a service path identifier and one or more service function items that define a service function chain in combination (702). Computing device 200 also receives a service function instance route specifying a service function type and a service identifier that identify, in combination, a service function instance (704).

Computing device 200 may receive a packet. In some cases, the packet has already been classified to a service function chain. In some cases, a service function instance hosted by computing device 200 classifies the packet to the service function chain. Computing device 200 determines the packet is classified to the service function chain (706). For example, the computing device 200 may determine a service path identifier of a network service header matches the service path identifier in the service function chain route. Because the packet is classified to the service function chain, computing device 200 may use the service function chain route that defines the service function chain to determine the next service function instance to process the packet. Computing device 200 may determine that a service function item in the service function chain route specifies the service function type and the service identifier that, in combination, identify the next service function instance according to the received service function instance route (708). Computing device 200 therefore responsively sends the packet to a computing device that hosts the next service function instance (710).

Figure 8:
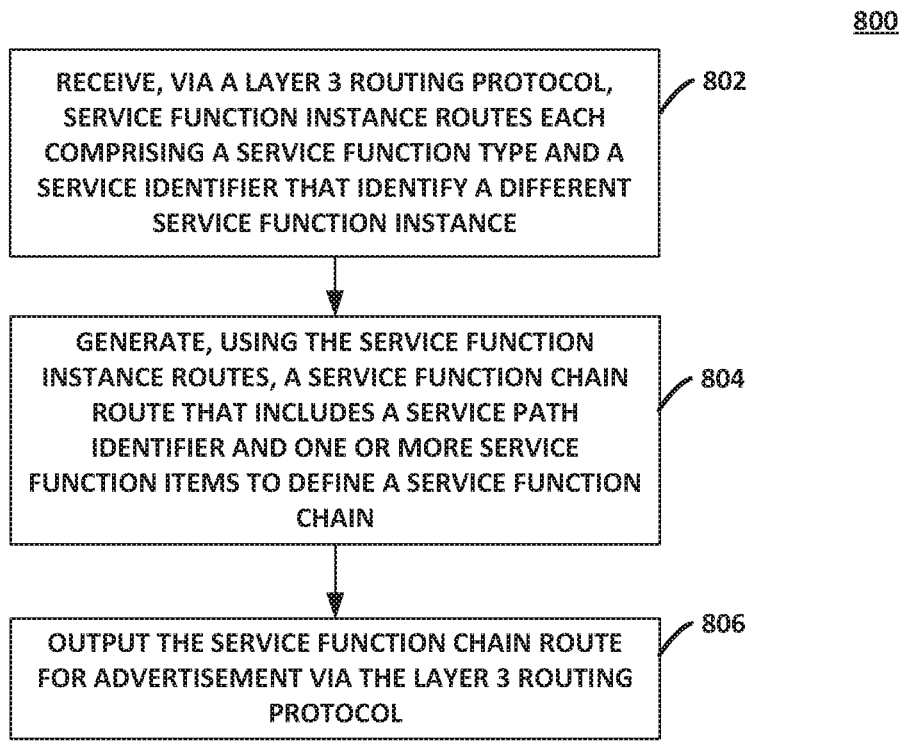
FIG. 8 is a flowchart illustrating an example mode of operation for a service function overlay network controller, according to techniques of this disclosure.

FIG. 8 is a flowchart illustrating an example mode of operation for a service function overlay network controller, according to techniques of this disclosure. Operation 800 is described with respect to controller 19 of FIG. 1 but may be performed by any controller described herein.

Controller 19 may execute a layer 3 routing protocol and receive, via the layer 3 routing protocol, service function instance routes each comprising a service function and a service identifier that identify a different service function instance (802). Based in part on the service function instance routes, controller 19 may generate a service function chain route to realize a service chain configured in service provider network 2 (804). For example, the service function chain route may include a service path identifier and one or more service function items to define the service function chain, where each service function item identifies a service function instance to apply, in order, service functions along the service function chain. Controller 19 may output the service function chain route for advertisement via the layer 3 routing protocol (806). In some examples, controller 19 receives service function instance data via a user interface or from a network controller, rather than in service function instance routes.

Figure 9:
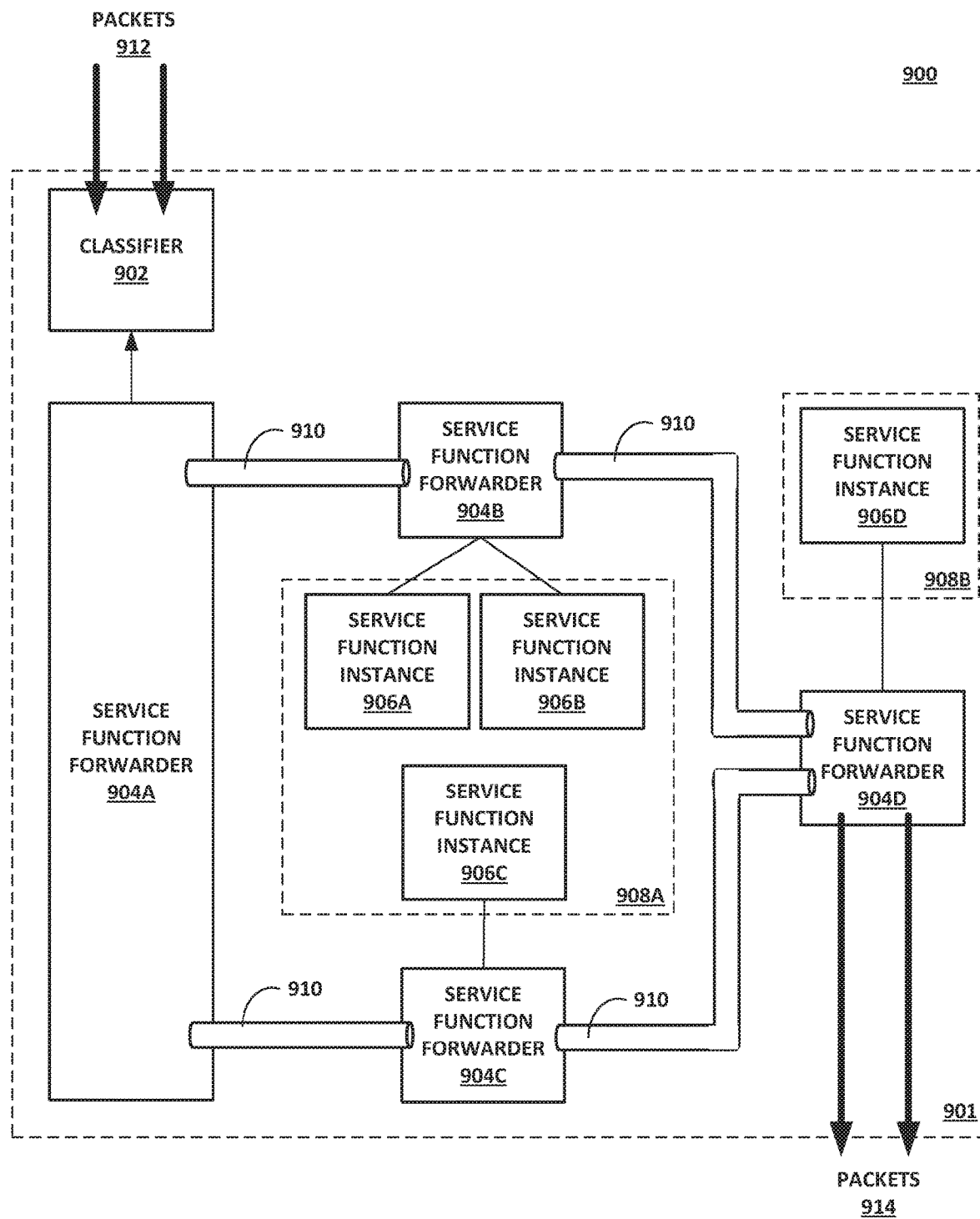
FIG. 9 is a block diagram illustrating an example service function chaining architecture reference model, according to techniques described herein.

FIG. 9 is a block diagram illustrating an example service function chaining architecture reference model, according to techniques described herein. In this example, service function overlay network 901 operates over a physical underlay network of interconnected computing devices each providing an operating environment for one or more service function forwarders 904A-904D. Each of service function forwarders 904 may represent an example instance of service function forwarder 222 or any service function forwarder described herein. Tunnels 910 connect pairs of service function forwarders 904 over the underlay network.

Service function overlay network 901 includes service function instances 906A-906D and classifier 902, which may also represent a service function instance. Each of service function instances 906 and classifier 902 is hosted or otherwise local to one of service function forwarders 904. For example, service function instances 906A, 906B are local to service function forwarder 904B and service function instance 906D is local to service function forwarder 904D. Each of service function instances 906 have a different service function type 908. Service function instances 906A, 906B, 906C all have service function type 908A, while service function instance 906D has a different service function type 908B.

Examples of service function overlay network 901 may have any number of service function forwarders 904, service function instances 906, and may be arranged in various overlay topologies as determined by the configuration of tunnel interfaces for tunnels 910.

Packets 912 ingress at classifier 902, which classifies each packet to a service function chain of one or more service function instances 906. Service function forwarders 904 exchange service function chain routes and service function instance routes as described elsewhere herein. Service function forwarders 904 selects a next service function instance 906 and forwards each classified packet along its service function chain via tunnels 910 to the next hop service function forwarder 904 that is local for the next service function instance 906, via tunnels 910. Once the last service function instance 906D in the service function chain processes the packets, the last service function forwarder 904D may egress the processed packets 914 from the service function overlay network 901 to their respective destinations.

Figure 10:
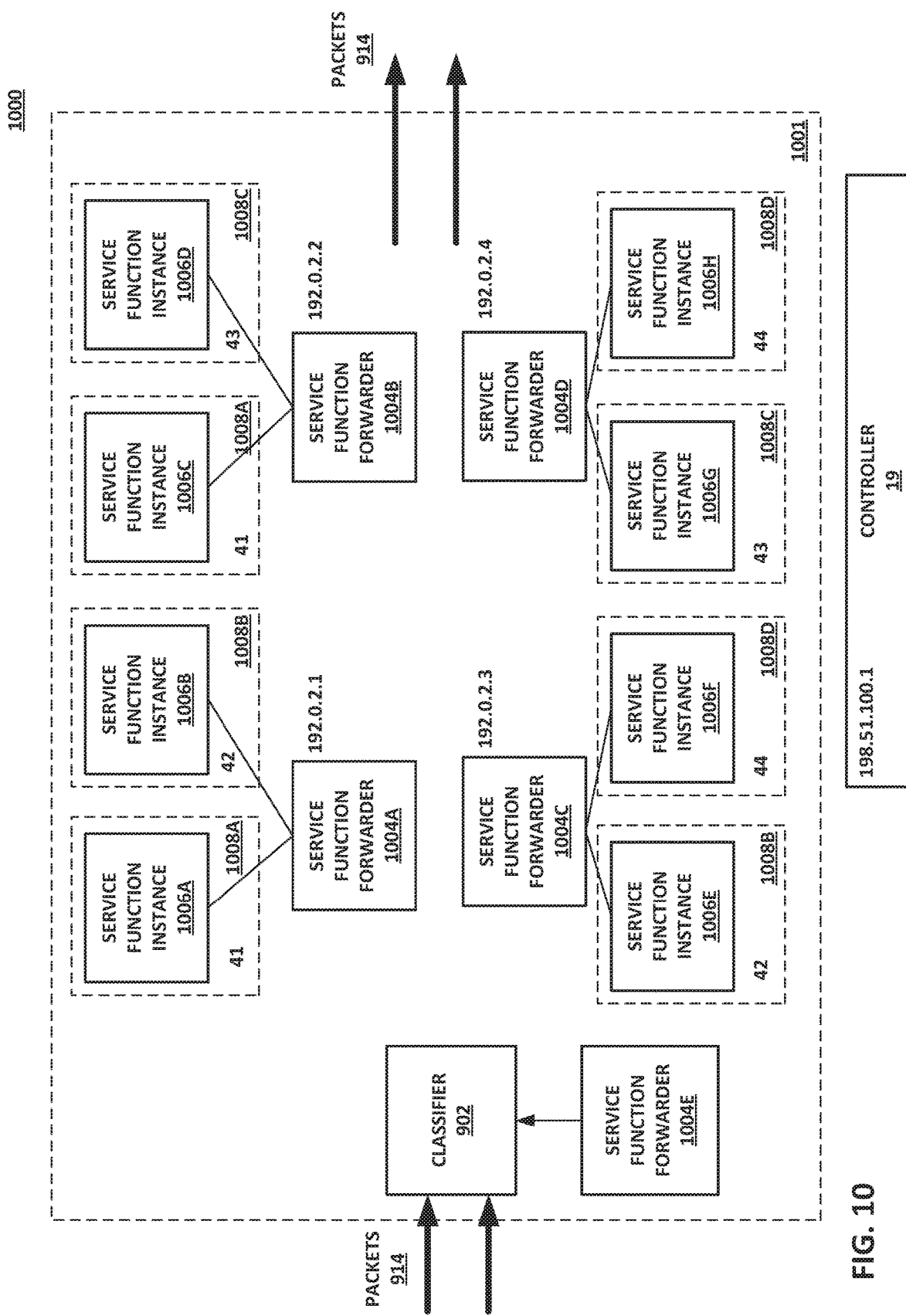
FIG. 10 is a block diagram illustrating an example service function overlay network, according to techniques described herein.

FIG. 10 is a block diagram illustrating an example service function overlay network, according to techniques described herein. Service function overlay network 1001 may be an example instance of the reference service function overlay network 901. In this example, service function overlay network 1001 includes service function forwarders 1004, service function instances 1006, classifier 902, and is managed by controller 19. Tunnels are not shown for ease of illustration. Each service function instance 1006 has a corresponding service function type 1008 value that is illustrated in FIG. 10. For example, the service function type 1008A value is 41 and is shared by service function instances 1006A, 1006C.

Each of service function forwarders 1004A-1004D has a corresponding network address illustrated in FIG. 10. Although illustrated and described with respect to an IPv4 address, other types of network addresses are contemplated, e.g., IPv6. For instance, service function forwarder 1004A has IP address 192.0.2.1. Service function forwarder 1004A provides access to service function instances 1006A, 1006B. Service function forwarder 1004B provides access to service function instances 1006C, 1006D. Service function forwarder 1004C provides access to service function instances 1006E, 1006F. Service function forwarder 1004D provides access to service function instances 1006G, 1006H. Controller 19 has IP address 198.51.100.1.

Each of service function forwarders 1004 advertise routes to the service function instances 1006 it provides access to. The following are example service function instance routes for service function instances 1006:

RD=192.0.2.1,1, SFT=41 [1006A]
RD=192.0.2.1,2, SFT=42 [1006B]
RD=192.0.2.2,1, SFT=41 [1006C]
RD=192.0.2.2,2, SFT=43 [1006D]
RD=192.0.2.3,7, SFT=42 [1006E]
RD=192.0.2.3,8, SFT=44 [1006F]
RD=192.0.2.4,5, SFT=43 [1006G]
RD=192.0.2.4,6, SFT=44 [1006H]

Route distinguisher (RD) is an example of a service distinguisher and includes the IP address of the advertising host and another value, and SFT is the service function type for the service function instance being advertised. Addressing used for communicating between service function forwarders 1004 is taken from the Tunnel Encapsulation attribute of the service function instance route and not from the RDs of the route.

The following is an example of an explicit service function chain (no choices for next hop). Consider the following service function chain route:

SFC1: RD=198.51.100.1,101, SPI=15, [SI=255, SFT=41, RD=192.0.2.1,1], [SI=250, SFT=43, RD=192.0.2.2,2]

The service function chain for SFC1 consists of a service function of type 41 located at service function forwarder 1004A followed by a service function of type 43 located at service function forwarder 1004B. This chain is fully explicit and each service function forwarder is offered no choice in forwarding packet along the chain. Service function forwarder 1004A will receive packets on the chain from the Classifier 902 and will identify the chain from the service path identifier (SPI) (value=15). The initial service index will be 255 and service function forwarder 1004A will deliver the packets to the service function instance 1006A having service function type 1008A with value 41.

When the packets are returned to service function forwarder 1004A by the service function instance 1006A the service index will be decreased to 250 for the next hop. Service function forwarder 1004A has no flexibility in the choice of service function forwarder to support the next hop service function instance and will forward the packet to function forwarder 1004B, which will send the packets to the service function instance 1006D having service function type 1008C with value 43 before forwarding the packets to their destinations.

The following is an example service function chain that provides a choice of service function instances. Consider the following service function chain route:

SFC2: RD=198.51.100.1,102, SPI=16, [SI=255, SFT=41, RD=192.0.2.1,], [SI=250, SFT=43, {RD=192.0.2.2,2, RD=192.0.2.4,5}]

In this example the chain also consists of a service function of type 41 located at service function forwarder 1004A and this is followed by a service function of type 43, but in this case the SI=250 contains a choice between the service function instance 1006D located at service function forwarder 1004B and the service function instance 1008C located at service function forwarder 1004D. Service function forwarder 1004A will receive packets on the chain from the Classifier 902 and will identify the chain from the service path identifier (value=16). The initial service index will be 255 and thus service function forwarder 1004A will deliver the packets to the service function instance 1006A for service function type 1008A having value 41.

When the packets are returned to service function forwarder 1004A by the service function instance 1006A the service index will be decreased to 250 for the next hop. Service function forwarder 1004A now has a choice of next hop service function forwarder to execute the next hop in the chain. Service function forwarder 1004A can either forward packets to service function forwarder 1004B or service function forwarder 1004D to execute a service function of type 43. Service function forwarder 1004A may use a local load balancing algorithm to make this choice. The selected service function forwarder 1004 will send the packets to the service function instance that supports service function type with value 43 before forwarding the packets to their destinations.

The following is an example service function chain with an open choice of service function instances. Consider the following service function chain route:

SFC3: RD=198.51.100.1,103, SPI=17, [SI=255, SFT=41, RD=192.0.2.1,1], [SI=250, SFT=44, RD=0]

In this example the chain also consists of a service function of type 41 located at service function forwarder 1004A and this is followed by a service index, 250, with a service function type with value=44 and an RD=0. The value of zero for RD is a special value that indicates that any service function forwarder that provides access to a service function instance of type 44 may be selected by service function forwarder 1004A.

Service function forwarder 1004A will receive packets on the chain from the Classifier and will identify the chain from the service path identifier (value=17). The initial service index will be 255 and service function forwarder 1004A will deliver the packets to the service function instance 1006A. When the packets are returned to service function forwarder 1004A by the service function instance 1006A the service index will be decreased to 250 for the next hop. Service function forwarder 1004A now has a free choice of next hop service function forwarder to execute the next hop in the chain, selecting between all service function forwarders that support service functions of type 44. Based on the service function instance routes it has received, service function forwarder 1004A knows that service function type 44 is supported by service function instances 1006F and 1006H supported by service function forwarder 1004C and service function forwarder 1004D, respectively. Service function forwarder 1004A may use its local load balancing algorithm to make this choice. The chosen service function forwarder will send the packets to the service function instance that supports service function type with value=44 before forwarding the packets to their destinations.

The following is an example service function chain with a choice of service function types. Consider the following service function chain route:

SFC4: RD=198.51.100.1,104, SPI=18, [SI=255, SFT=41, RD=192.0.2.1,1], [SI=250, {SFT=43, RD=192.0.2.2,2, SFT=44, RD=192.0.2.3,8}]

This example provides a choice of service function type in the second hop in the service function chain. That is, service index with value 250 indicates a choice between service function type with value=43 at service function forwarder 1008B and service function type with value=44 located at service function forwarder 1008C.

Service function forwarder 1004A will receive packets on the chain from the Classifier 902 and will identify the chain from the service path identifier (value=18). The initial service index will be 255 and so Service function forwarder 1004A will deliver the packets to the service function instance 1006A supporting service function type 1008A with value=41. When the packets are returned to service function forwarder 1004A by the service function instance 1006A the service index will be decreased to 250 for the next hop. Service function forwarder 1004A now has a free choice of next hop service function forwarder to execute the next hop in the chain selecting between service function forwarder 1004B that supports service function instance 1006D having service function type with value=43 and service function forwarder 1004C that supports service function instance 1006F having service function type with value=44. These may be different service functions that are to be executed dependent on specific conditions, or may be similar functions identified with different type identifiers (such as firewalls from different vendors). Service function forwarder 1004A may use local policies and load balancing algorithm to make this choice, and may in some cases use additional information passed back from the local service function instance 1006A to help inform its selection. The chosen service function forwarder will send the packets to the service function instance that supports the selected service function type before forwarding the packets to their destinations.

The following are example correlated bidirectional service function chains. Consider the following service function chain routes:

SFC5: RD=198.51.100.1,105, SPI=19, Assoc-Type=1, Assoc-RD=198.51.100.1,106, Assoc-SPI=20, [SI=255, SFT=41, RD=192.0.2.1,1], [SI=250, SFT=43, RD=192.0.2.2,2]

SFC6: RD=198.51.100.1,106, SPI=20, Assoc-Type=1, Assoc-RD=198.51.100.1,105, Assoc-SPI=19, [SI=254, SFT=43, RD=192.0.2.2,2], [SI=249, SFT=41, RD=192.0.2.1,1]

The examples demonstrate correlation of two service function chains to form a bidirectional service function chains as described above. Two service function chain routes, SFC5 and SFC6, are advertised by controller 19. SFC5 and SFC6 have different service path identifiers (values 19 and 20) so they are known to be separate service function chains, but they both have correlator fields that indicate bidirectional service function chains. For examples, they may both have Association TLVs with Association Type set to 1 indicating bidirectional SFCs. The Association TLV may be included in a service path attribute. Each may also include an Associated service function chain route-RD field (Assoc-RD) containing the value of the other service function chain route RD, as well as an associated service path identifier (Assoc-SPI) field to correlate the two service function chains as a bidirectional pair. As can be seen from the service function chain routes in this example, the chains are symmetric: the hops in SFC5 appear in the reverse order in SFC6.

The following are example correlated bidirectional and asymmetrical service function chains. Consider the following service function chain routes:

SFC7: RD=198.51.100.1,107, SPI=21, Assoc-Type=1, Assoc-RD=198.51.100.1,108, Assoc-SPI=22, [SI=255, SFT=41, RD=192.0.2.1,1], [SI=250, SFT=43, RD=192.0.2.2,2]

SFC8: RD=198.51.100.1,108, SPI=22, Assoc-Type=1, Assoc-RD=198.51.100.1,107, Assoc-SPI=21, [SI=254, SFT=44, RD=192.0.2.4,6], [SI=249, SFT=41, RD=192.0.2.1,1]

Asymmetric bidirectional service function chains can also be created. This example shows a pair of service function chains, SFC7 and SFC8, with distinct service path identifiers (values 21 and 22) that are correlated similarly to SFC7 and SFC8 in the previous example. However, unlike in that example, the service function chains are different in each direction. Both chains include a hop of service function type with value 41, but SFC7 includes a hop of service function type with value 43 supported at service function forwarder 1004B while SFC8 includes a hop of service function type with value 44 supported at service function forwarder 1004D.

The following is an example of looping using a service function chain. Consider the following service function chain route:

SFC9: RD=198.51.100.1,109, SPI=23, [SI=255, SFT=41, RD=192.0.2.1,1], [SI=250, SFT=44, RD=192.0.2.4,5], [SI=245, SFT=1, RD={SPI=23, SI=255, Rsv=0}], [SI=245, SFT=42, RD=192.0.2.3,7]

Looping and jumping are described above with respect to FIG. 2, for instance. This example service function chain route contains an explicit loop-back instruction encoded within a route distinguisher that is presented as a choice within a service function chain hop for the service index with value=245.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a computing device, a first layer 3 routing protocol route advertisement that includes service function instance data for a service function instance, the service function instance data indicating a service function type and a service identifier for the service function instance;
receiving, by the computing device, a second layer 3 routing protocol route advertisement that includes service function chain data for a service function chain, the service function chain data indicating a service path identifier and one or more service function items; and
sending, by the computing device to the service function instance and based at least on determining a service function item of the one or more service function items indicates the service function instance, a packet classified to the service function chain.

2. The method of claim 1, wherein determining a service function item of the one or more service function items indicates the service function instance comprises:
determining, by the computing device, the service function item of the one or more service function items indicates the service function type and the service identifier.

3. The method of claim 1,
wherein the service function item of the one or more service function items indicates the service function type and the service identifier, and
wherein the service identifier indicates any service function instance of a plurality of service function instances that applies the service function indicated by the service function type is a suitable service function instance.

4. The method of claim 1, wherein each service function item of the one or more service function items includes a service index that indicates a location for the service function item in an order of the service function chain, the method further comprising:
receiving, by the computing device, the packet encapsulated with a network service header that includes a service path identifier and a service index,
wherein determining the service function item of the one or more service function items indicates the service function instance comprises, by the computing device, matching the service path identifier of the network service header and the service path identifier of the service function chain data and matching the service index of the network service header and the service index of the service function item.

5. The method of claim 1,
wherein the service function instance comprises a first service function instance,
wherein the service function instance data comprises first service function instance data, the method further comprising:
outputting, by the computing device, a third layer 3 routing protocol route advertisement protocol route advertisement that includes second service function instance data for a second service function instance hosted by the computing device to apply a service function, the second service function instance data indicating a service function type and a service identifier for the second service function instance.

6. The method of claim 5, wherein a second service function item of the one or more service function items indicates the second service function instance hosted by the computing device, the method further comprising:
applying, by the computing device, the service function to the packet.

7. The method of claim 1, wherein the first layer 3 routing protocol route advertisement protocol route advertisement comprises a Border Gateway Protocol UPDATE message that includes a service function chaining Network Layer Reachability Information that indicates the service function type and the service identifier.

8. The method of claim 7, wherein the service identifier comprises a Route Distinguisher.

9. The method of claim 7, wherein the Border Gateway Protocol UPDATE message comprises an encapsulation attribute that includes a network address for a computing device that hosts the service function instance, the method further comprising:
encapsulating, by the computing device based on the encapsulation attribute, the packet with a tunnel encapsulation header that includes the network address for the computing device to generate a tunnel packet; and
sending, by the computing device to the computing device that hosts the service function instance, the tunnel packet.

10. The method of claim 1, wherein the second layer 3 routing protocol route advertisement comprises a Border Gateway Protocol UPDATE message that includes a service function chaining Network Layer Reachability Information that includes the service function chain data.

11. The method of claim 10, wherein the Border Gateway Protocol UPDATE message comprises a service function chain BGP Path attribute that includes the one or more service function items.

12. The method of claim 1, wherein the service function chain data includes a correlator that indicates the service function chain and another service function chain are to process a packet flow and a reverse packet flow for the packet flow, respectively.

13. The method of claim 1, wherein the sending comprises:
encapsulating, by the computing device, the packet with a network service header that includes the service index and the service path identifier; and sending the packet with the network service header.

14. The method of claim 1, wherein the first layer 3 routing protocol route advertisement and second layer 3 routing protocol route advertisement are each associated with a route target, the method further comprising:
importing, by the computing device in response to determining the computing device is configured to import the route target, the service function instance data and the service function chain data.

15. The method of claim 1, wherein the packet comprises a first packet, the method further comprising:
receiving, by the computing device, a second packet encapsulated with a network service header that includes the service path identifier and a service index for the service chain;

branching, by the computing device, the second packet to a new service function chain by encapsulating the packet with a new network service header that indicates a service path identifier for the new service function chain.

16. The method of claim 1,
wherein the packet comprises a first packet,
wherein the service function instance comprises a first service function instance, the method further comprising:
receiving, by the computing device, a second packet encapsulated with a network service header that includes the service path identifier and a service index for the service chain;
looping or jumping, by the computing device, the second packet to a second service function instance by selecting a new service index for the packet that is other than a next service index after the service index in the service function chain.

17. A computing device comprising:
one or more processors operably coupled to a memory;
a first service function instance configured for execution by the one or more processors to apply a service function;
a service function forwarder configured for execution by the one or more processors to:
receive a first layer 3 routing protocol route advertisement that includes service function instance data for a second service function instance, the service function instance data indicating a service function type and a service identifier for the service function instance;
receive a second layer 3 routing protocol route advertisement that includes service function chain data for a service function chain, the service function chain data indicating a service path identifier and one or more service function items; and
send, to the second service function instance and based at least on determining a service function item of the one or more service function items indicates the second service function instance, a packet classified to the service function chain.

18. A controller comprising:
one or more processors operably coupled to a memory,
wherein the one or more processors are configured to output a first layer 3 routing protocol route advertisement that includes service function chain data for a service function chain, the service function chain data indicating a service path identifier and one or more service function items,
wherein the one or more processors are further configured to:
receive one or more layer 3 routing protocol route advertisements that include respective service function instance data for respective service function instances; and
generate the one or more service function items from the respective service function instance data from the one or more layer 3 routing protocol route advertisements.

* * * * *